United States Patent
Ikeda et al.

(10) Patent No.: US 6,324,128 B1
(45) Date of Patent: *Nov. 27, 2001

(54) OPTICAL STORAGE APPARATUS AND RECORDING AND REPRODUCING METHOD OF OPTICAL STORAGE MEDIUM

(75) Inventors: Toru Ikeda; Shigenori Yanagi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,326

(22) Filed: Dec. 2, 1997

(30) Foreign Application Priority Data

Jun. 30, 1997 (JP) ...... 9-173593

(51) Int. Cl.[7] ...... G11B 11/00
(52) U.S. Cl. ...... 369/13; 369/53.2
(58) Field of Search ...... 369/13, 116, 110.1, 369/14, 47.1, 53.1, 53.11, 47.15, 53.2, 59.1, 275.3, 275.4, 275.1, 275.2; 360/59, 114

(56) References Cited

U.S. PATENT DOCUMENTS

| | | | |
|---|---|---|---|
| 5,579,294 | * 11/1996 | Ohta et al. | 364/58 |
| 5,608,710 | * 3/1997 | Minemura et al. | 369/116 |
| 5,623,458 | * 4/1997 | Matsumoto et al. | 369/13 |
| 5,754,500 | * 5/1998 | Tanaka et al. | 369/13 |

FOREIGN PATENT DOCUMENTS

| | | |
|---|---|---|
| 58179904 | 10/1983 | (JP) . |
| 61260439 | 11/1986 | (JP) . |
| 01191325 | 8/1989 | (JP) . |
| 01201846 | 8/1989 | (JP) . |
| 1191356 | 8/1989 | (JP) . |
| 3116566 | 5/1991 | (JP) . |
| 3162748 | 7/1991 | (JP) . |
| 04258831 | 9/1992 | (JP) . |
| 06150423 | 5/1994 | (JP) . |
| 6349099 | 12/1994 | (JP) . |
| 7050028 | 2/1995 | (JP) . |
| 7244877 | 9/1995 | (JP) . |
| 8221760 | 8/1996 | (JP) . |

* cited by examiner

Primary Examiner—Ali Neyzari
(74) Attorney, Agent, or Firm—Greer, Burns & Crain, Ltd.

(57) ABSTRACT

A reproducing magnetic field correcting unit, a reproducing state is monitored while increasing a reproducing magnetic field by using a predetermined reproducing magnetic field as an initial value H1, and a reproducing magnetic field when a reproducible state is obtained is determined as an optimum magnetic field. A reproducing magnetic field obtained by adding a predetermined value to the reproducing magnetic field in the reproducible state is used as an optimum reproducing magnetic field. A change in reproducing magnetic field is started from the low magnetic field in which a predetermined value is subtracted from the initial value. A shoulder portion is certainly detected and the optimum magnetic field is set.

24 Claims, 18 Drawing Sheets

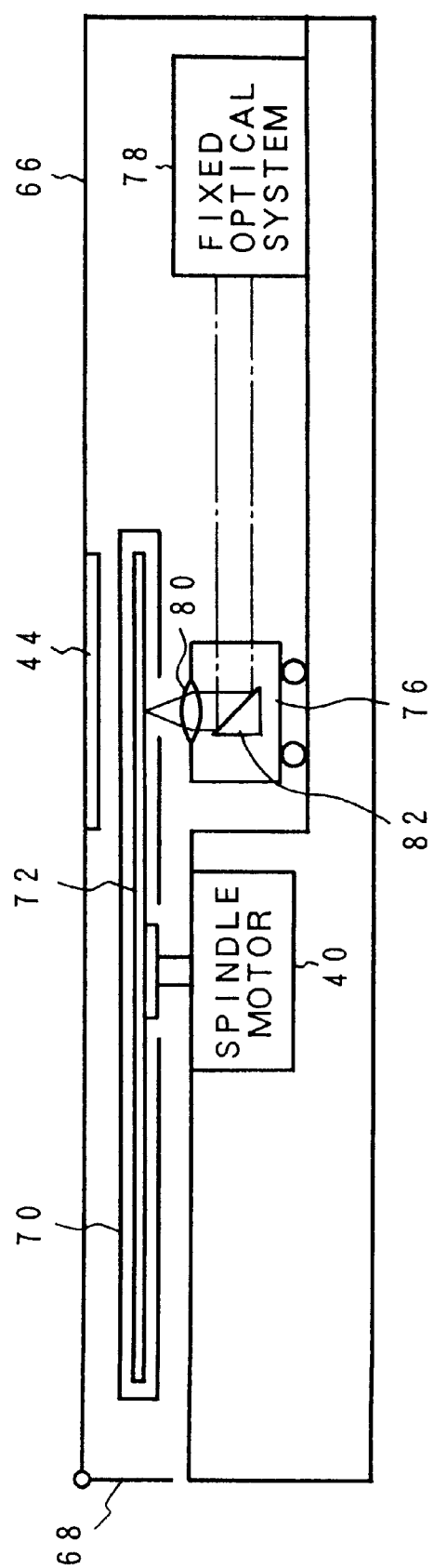

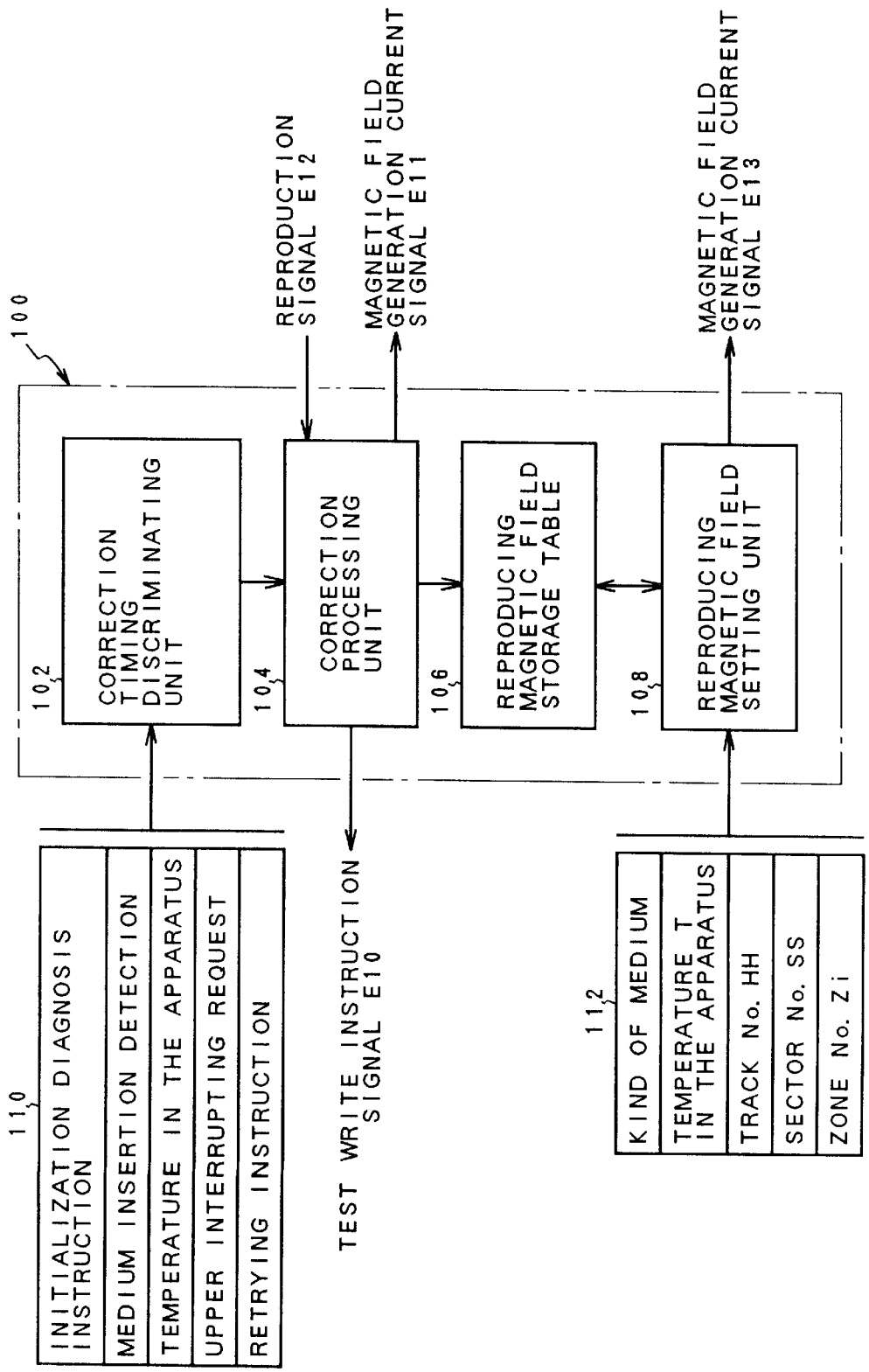

FIG. 6

| ZONE No. i | ELECTROMAGNET CURRENT |
| --- | --- |
| 1 | $Iz1$ |
| 2 | $Iz2$ |
| 3 | $Iz3$ |
| 4 | $Iz4$ |
| 5 | $Iz5$ |
| 6 | $Iz6$ |
| 7 | $Iz7$ |
| 8 | $Iz8$ |
| 9 | $Iz9$ |
| 10 | $Iz10$ |
| 11 | $Iz11$ |

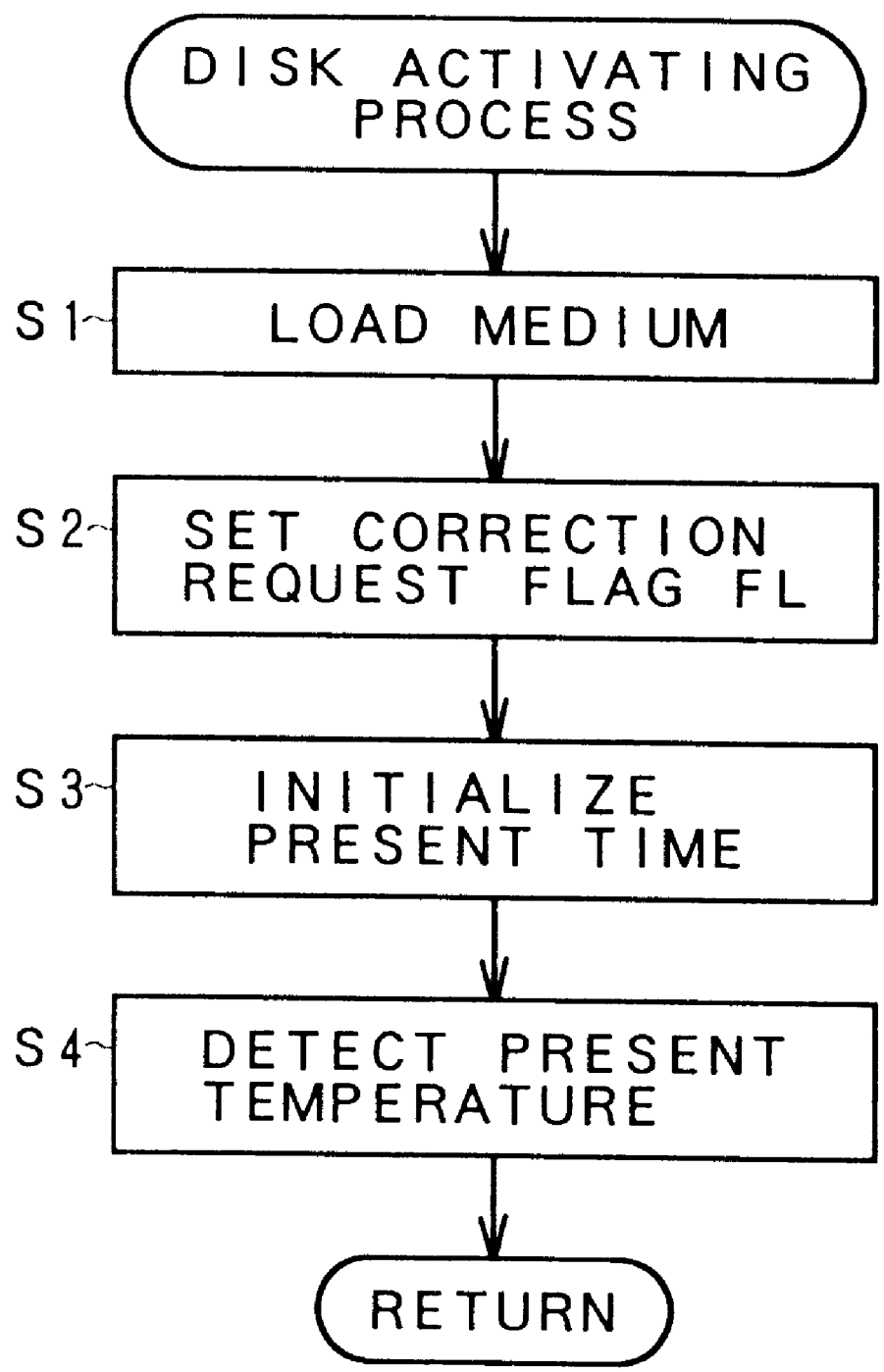

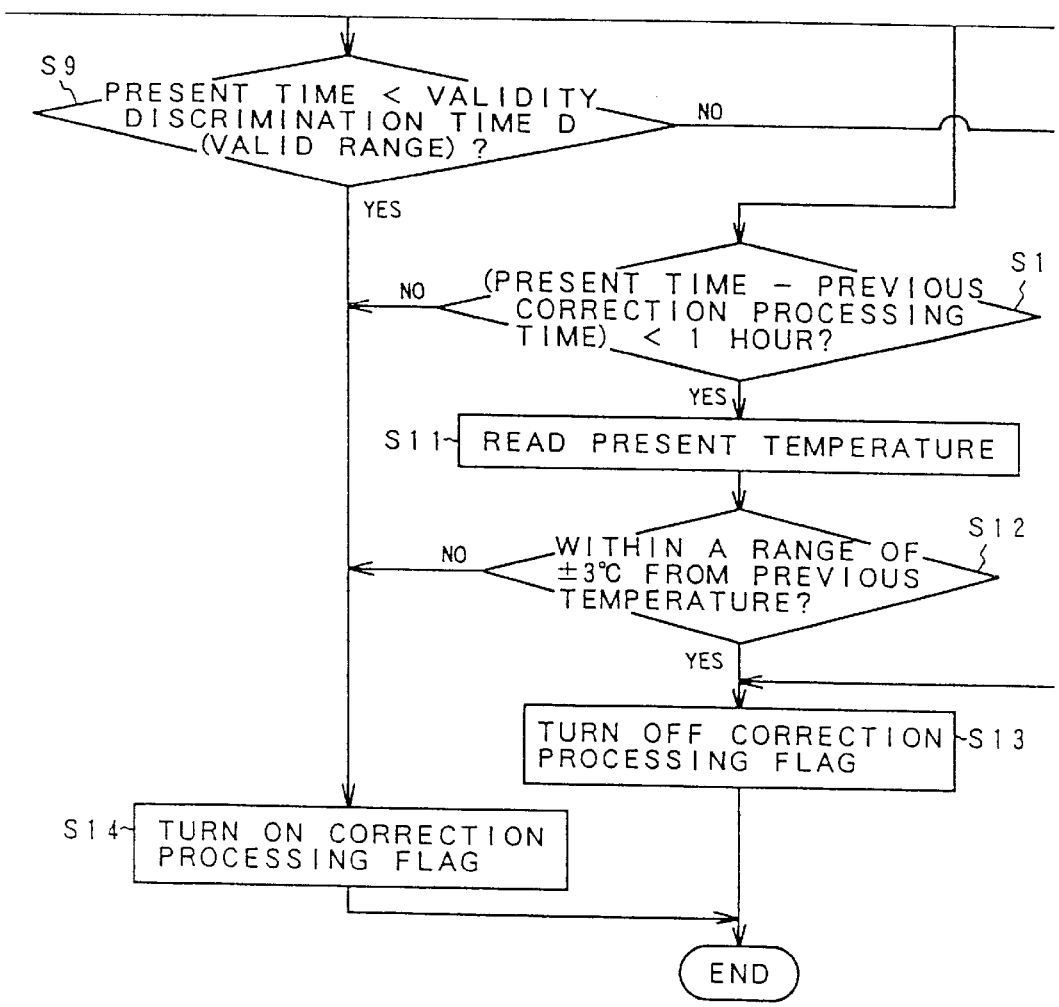

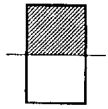
FIG. 13A
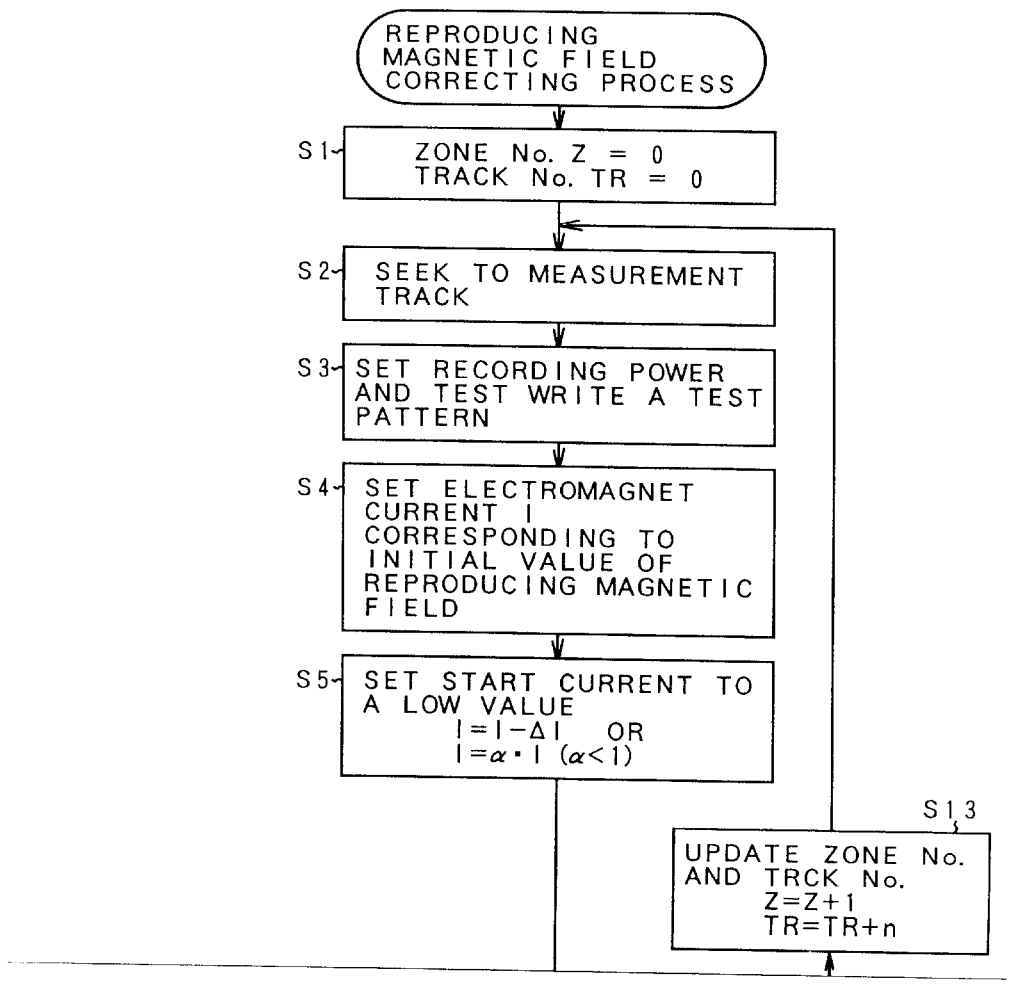

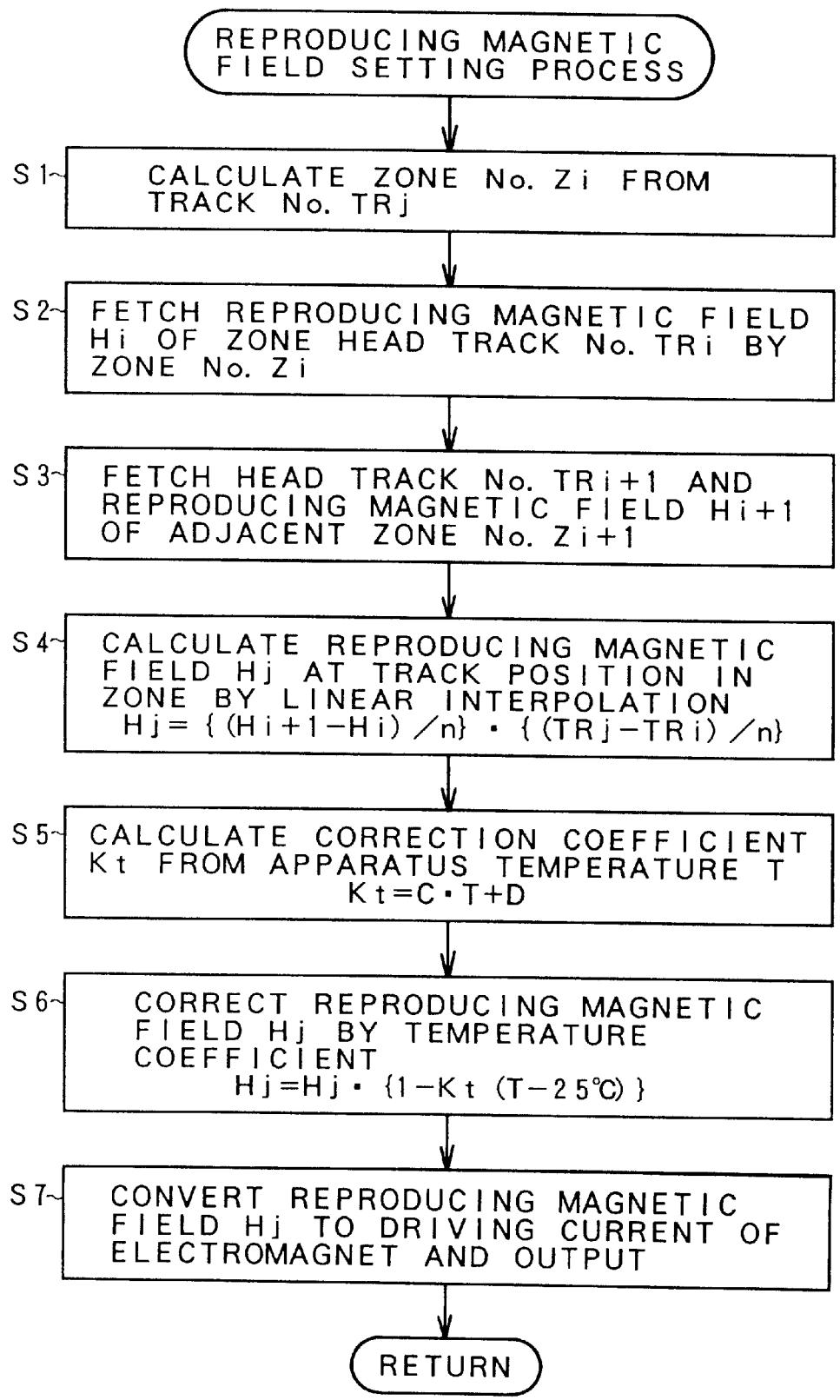

OPTICAL STORAGE APPARATUS AND RECORDING AND REPRODUCING METHOD OF OPTICAL STORAGE MEDIUM

BACKGROUND OF THE INVENTION

The invention relates to an optical storage apparatus for recording and reproducing information by using a laser beam and to a recording and reproducing method of an optical storage medium. More particularly, the invention relates to an optical storage apparatus for recording and reproducing data at a density that is smaller than a beam diameter as is known as an MSR (Magnetically induced Super Resolution) technique and to a recording and reproducing method of an optical storage medium.

In recent years, an optical disk is being highlighted as an external storage medium of a computer. In the optical disk, by forming magnetic recording pits of a submicrometer order onto a medium by using a laser beam, a recording capacity can be remarkably increased as compared with a floppy disk or a hard disk as a conventional external storage medium. Further, information can be rewritten in a magnetooptic disk as a perpendicular magnetic storage medium using a rare earth—transition metal system material, so that its future development is more and more expected.

The optical disk of, for example, 3.5 inches has a storage capacity of 540 MB or 640 MB on one side. This means that a storage capacity of one floppy disk of 3.5 inches is equal to about 1 MB and one optical disk has storage capacity as much as that of 540 or 640 floppy disks. As mentioned above, the optical disk is a rewritable storage medium having an extremely high recording density. However, in order to get ready for the multimedia age in the future, it is necessary to increase the recording density of the optical disk even higher than that of the present optical disks. To increase the recording density, a greater number of pits have to be recorded on the medium. For this purpose, it is necessary to further decrease the pit size from the present size and to narrow the interval between the pits. In case of raising the recording density by such a method, it is further necessary to shorten a wavelength of the laser beam below the present wavelength of 670 nm. However, in case of considering the practical use, the pit size has to be reduced in the present wavelength of 670 nm. In this case, as for the recording, a pit which is smaller than the beam diameter can be formed by controlling a power of the laser beam. As for the reproduction, however, when the pit that is smaller than the beam diameter is reproduced, a crosstalk with the adjacent pit increases. In the worst case, the adjacent pit also enters the reproducing beam. When a practical use is considered, it is very difficult to use such a method.

As a method of reproducing a pit smaller than the beam diameter by the existing wavelength of 670 nm, there is a magnetooptical recording and reproducing method represented by JP-A-3-93058 and this method is known as a recording and reproducing method by the MSR (Magnetically induced Super Resolution). Presently, there are two general methods of MSR an FAD (Front Aperture Detection) system and an RAD (Rear Aperture Detection) 10 system. In the FAD system, as shown in FIGS. 1A and 1B, a recording medium is divided into a recording layer 220 and a reproducing layer 216. Data is reproduced using a reproducing magnetic field Hr applied to the medium in a state in which a laser spot 222 of a reading beam is irradiated. Depending on a temperature distribution within heating by the laser spot 222, a magnetic coupling of a switching layer 218 formed in a boundary with the recording layer 220 is released, such and such a portion of the beam spot is influenced by the reproducing magnetic field Hr and becomes a mask. On the other hand, as for a portion of the next recording pit, the magnetic coupling in the switching layer 218 is held and this 25 portion becomes an opening 224. Consequently, within the laser spot 222, only a pit 230 of the opening 224 can be read without being influenced by the adjacent pit 226. On the other hand, according to the RAD system, as shown in FIGS. 2A and 2B, an initialization to align a magnetizing direction of the reproducing layer 216 to a predetermined direction is performed by using an initializing magnet 232. The reading operation is performed by slightly raising a reproducing laser power upon reproduction. Depending on the temperature distribution within laser spot 234 of the reading beam, a mask 236 in which initial magnetization information remains and an opening 238 in which the initial magnetization information is erased and magnetization information of the recording layer 220 is transferred are formed in the reproducing layer 216. The magnetization information of the recording layer 220 transferred to the reproducing layer 216 is converted into an optical signal by a magnetooptic effect (Kerr effect or Faraday effect), so that data is reproduced. In this instance, as compared with a pit 228 of the recording layer 220 which is being read out at present, the pit 230 of the recording layer 220 to be subsequently read out is not transferred due to the formation of the mask 236 by the initial magnetization information in the reproducing layer 216. Therefore, even when the recording pit is smaller than the laser spot 234, no crosstalk occurs and the pit which is smaller than the beam diameter can be reproduced. Further, by using such a magnetically induced super resolution, since an area of the recording layer 220 except for the reproduced portion is masked by the initialized reproducing layer 216, a pit interference from the adjacent pit doesn't occur. Further, since a pit interval can be reduced and a crosstalk from the adjacent track can be also suppressed, a track pitch can be reduced and a high density can be realized even by using the existing wavelength of 780 nm.

However, in the conventional optical disk apparatus using such a magnetically induced super resolution, there is a problem that a proper reproducing operation cannot be performed unless an intensity of the reproducing magnetic field which is used upon reproduction is strictly controlled. The reason is that, for example, when the reproducing magnetic field Hr is too low in the FAD system in FIG. 1A, a forming range of the mask 226 in FIG. 1B by the magnetization of the reproducing layer 216 is reduced and the pit 228 is not masked, so that a crosstalk occurs. When the reproducing magnetic field is too strong, the forming range of the mask 226 is widened and the pit 230 is also partially masked, so that a reproducing level decreases and an error occurs. At the same time, the reproducing magnetic field Hr also acts on the recording layer 220 and there is a possibility of erasure of the recording data. When the initializing magnetic field is too low in the RAD system in FIG. 2A, an erasing range by a beam heating of the initializing magnetization of the reproducing layer 216 is widened and the forming range of the mask portion decreases, so that the pit 230 in FIG. 2B is not masked and a crosstalk occurs. When the initializing magnetic field is too strong, the erasing range by the beam heating of the initializing magnetization of the reproducing layer 216 is narrowed and the forming range of the mask 236 is widened, so that the pit 228 is partially masked, the reproducing level decreases, and an error occurs. At the same time, when the initializing magnetic field is too strong, the magnetic field also acts on the recording layer 220 and there is a possibility of erasure of the recording data. Moreover, the reproducing magnetic field and the initializing magnetic field are dependent upon the environmental temperature of the apparatus. That is, when the environmental temperature in the apparatus changes to the lower side, hysteresis characteristics of the reproducing layer become thick. In order to obtain the same magnetizing characteristics (magnetic flux density), the reproducing magnetic field has to be intensified. On the contrary, when the environmental temperature changes to the higher side, the hysteresis characteristics of the reproducing layer become thin. In order to obtain the same magnetizing characteristics, the reproducing magnetic field has to be weakened.

SUMMARY OF THE INVENTION

According to the invention, there are provided optical storage apparatus and recording and reproducing method of an optical storage medium, in which when a magnetically induced super resolution is used, an intensity of an external magnetic field to be used upon reproduction is properly set, thereby preventing the signal level of a reproduction signal from deteriorations and insuring that reproduction can be performed.

First, an optical disk apparatus of the invention uses a magnetooptic storage medium having at least a recording layer to record data and a reproducing layer to reproduce the data recorded on the recording layer on a substrate. A recording unit records data into the recording layer of the magnetooptic storage medium at a recording density that is smaller than a beam diameter of a laser beam. A reproducing unit reproduces the data recorded in the recording layer of the magnetooptic storage medium at a recording density smaller than the beam diameter by setting a reproducing magnetic field and a reproducing laser power which are applied by a magnetic field applying unit such as permanent magnet, electromagnet, or the like to proper values. In addition to those units, a reproducing magnetic field correcting unit is provided, a reproducing state by the reproducing unit is monitored while increasing the reproducing magnetic field by using a predetermined reproducing magnetic field as an initial value, and the reproducing magnetic field when the reproducing unit is in a reproducible state is decided as an optimum magnetic field. Therefore, even when the reproducing power and/or the environmental temperature in the apparatus change or when a medium having different characteristics is loaded, a situation such that the reproducing magnetic field is too strong and a mask portion is widened, so that the recording data cannot be read out or the recording data is erased can be certainly prevented. It is also possible to reduce an electric power consumption of the apparatus by reducing a current to be supplied to the magnetic field applying unit. Further, a situation such that the reproducing magnetic field is too weak and the mask portion is narrowed, so that an error occurs by a crosstalk with an adjacent pit can be also certainly prevented.

The reproducing magnetic field correcting unit sets a reproducing magnetic field obtained by adding a predetermined value to a reproducing magnetic field in a reproducible state in which the number of times of dissidence of a reproduction data bit is equal to or less than a threshold value to an optimum reproducing magnetic field. The reason is as follows. When an external magnetic field is increased from an initial value, for example, a change in number of times of dissidence of the reproduction data has characteristics having a shoulder such that the number of times of dissidence decreases to a specified value or less and is stabilized and, after that, it again increases. Accordingly, since a shoulder portion in which the number of times of dissidence is stabilized to a threshold value or less is detected as a reproducible state, the predetermined value is added to the reproducing magnetic field in the reproducible state so that an optimum value is located to almost the center of the stable portion. In this case, even if a predetermined coefficient $\alpha$ (=1.x) exceeding 1 is multiplied to the reproducing magnetic field in the reproducible state, the same result will be derived. The reproducing magnetic field correcting unit starts the correction of the reproducing magnetic field from a low magnetic field obtained by subtracting a predetermined value from the reproducing magnetic field initial value. The above point also depends on shoulder characteristics when the reproducing magnetic field is increased. Since the initial value of the reproducing magnetic field is ordinarily set to the shoulder portion, by starting the correcting process from a magnetic field that is slightly lower than such an initial value, the shoulder portion is surely detected and the optimum magnetic field can be set. In this case as well, even if the correction of the reproducing magnetic field is started from a low magnetic field obtained by multiplying a predetermined coefficient $\beta$ (=0.x) smaller than 1 to the reproducing magnetic field initial value, the same result will be derived. The reproducing magnetic field correcting unit limits a correction value of the reproducing magnetic field so as not to be equal to or larger than a predetermined value in order to prevent that the recording data is erased at the time of the correcting process. The reproducible state is discriminated by the reproducing magnetic field correcting unit on the basis of any one of the following discriminating conditions.

I. A point that a level of a peak detection signal of an RF signal reproduced from a medium return light by the reproducing unit is equal to or larger than a predetermined value is detected, thereby deciding that the reproduction is possible.

II. The reproduction data of the reproducing unit and the recording data at the reproducing position which has previously been known are compared on a bit unit basis and a point that the number of bit errors (number of times of dissidence) is equal to or less than a predetermined value is detected, thereby deciding that the reproduction is possible.

III. A point that the number of correction errors for the reproduction data of the reproducing unit is equal to or less than a predetermined value is detected, thereby deciding that the reproduction is possible.

The reproducing magnetic field correcting unit determines the optimum magnetic field every predetermined zone of the optical storage medium and stores it into a memory (reproducing magnetic field storage table). A reproducing magnetic field setting unit of the reproducing unit reads out the optimum reproducing magnetic field of a zone corresponding to a reproducing position of the optical storage medium from the memory and drives the magnetic field applying unit. In this instance, the optimum reproducing magnetic field corresponding to the reproducing position of the optical storage medium is obtained by a linear approximation of the optimum magnetic field of the zone read out from the memory, thereby driving the magnetic field applying unit. The reproducing magnetic field setting unit of the reproducing unit corrects the optimum reproducing magnetic field decided by the reproducing magnetic field correcting unit by the temperature in the apparatus upon reproduction, thereby driving the magnetic field applying unit. The reproducing unit generates the optimum reproducing magnetic field decided by the reproducing magnetic field correcting unit only for a reproducing period in a sector of the optical storage medium in which a reproduction gate signal is ON.

The reproducing magnetic field correcting unit performs the correcting process of the reproducing magnetic field at the following timings.

I. At the time of the initialization diagnosing process in association with a turn-on of a power source of the apparatus II. When the optical storage medium is loaded into the apparatus III. When a change in temperature in the apparatus is equal to or larger than a predetermined value IV. When a predetermined correcting valid time elapses by monitoring the elapsed time after the preceding correction V. When a reproduction error occurs and a retrying process is performed VI. When the apparatus is started up in a factory The reproducing magnetic field correcting unit temporarily stops the correction when an interrupting request is generated from an upper apparatus during the correction of the reproducing magnetic field and restarts the process from the interrupted portion after completion of the interrupting process.

According to the invention, there is also provided a recording and reproducing method of an optical storage medium, comprising the steps of:

recording data into a recording layer of an optical storage medium at a recording density that is smaller than a beam diameter of a laser beam by using the optical storage medium having at least a recording layer to record data and a reproducing layer to reproduce the data recorded in the recording layer on a substrate;

reproducing the data recorded in the recording layer of the optical storage medium at a recording density smaller than the beam diameter by setting a reproducing magnetic field and a reproducing laser power which are applied by a magnetic field applying unit to proper values; and prior to the reproduction of the optical storage medium, executing a reproducing magnetic field correcting process for monitoring a reproducing state while increasing the reproducing magnetic field by using a predetermined reproducing magnetic field as an initial value and for determining the reproducing magnetic field in a reproducible state as an optimum reproducing magnetic field.

Details of the recording and reproducing method of the optical storage medium are substantially the same as those in the construction of the apparatus.

The above and other objects, features, and advantages of the present invention will become more apparent from the following detailed description with reference to drawings.

BRIEF DESCRIPTION OF THE DRAWINGS

FIG. 4 is an explanatory diagram of an internal structure of an apparatus in which an MO cartridge is loaded;

FIG. 5 is a functional block diagram of a reproducing magnetic field correction processing unit which is realized by an MPU in FIGS. 3A and 3B;

FIG. 6 is an explanatory diagram of a reproducing magnetic field storage table in FIG. 5;

FIG. 11 is a flowchart for a disk activating process prior to the reproducing magnetic field correcting process in FIG. 10;

FIGS. 13A and 13B are flowcharts for the reproducing magnetic field correcting process in FIG. 10; and FIG. 14 is a flowchart for a linear interpolation and a temperature correcting process by the reproducing magnetic field setting unit in FIG. 5.

DETAILED DESCRIPTION OF THE PREFERRED EMBODIMENT

Figure 2A:
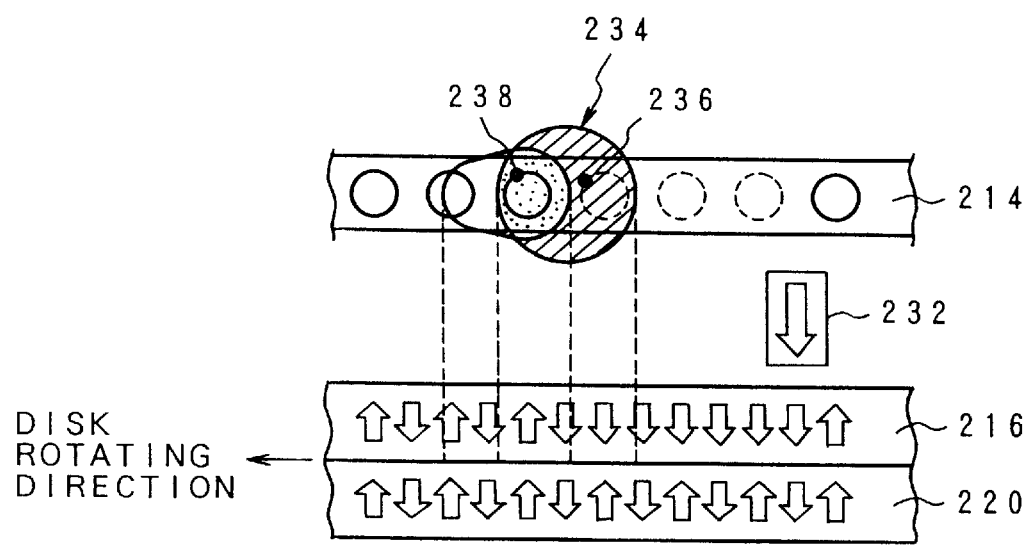
FIGS. 2A and 2B are explanatory diagrams of the reproducing operation of the conventional RAD system.
Figure 2B:
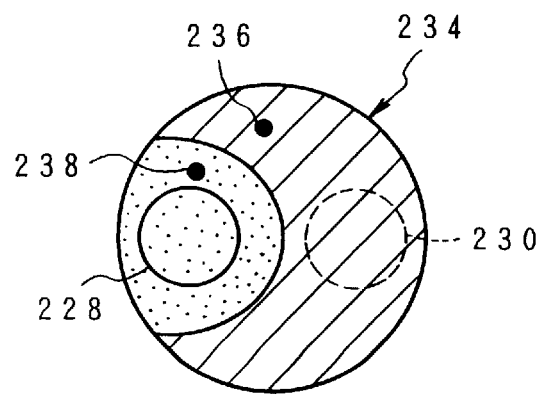
Figure 3A:
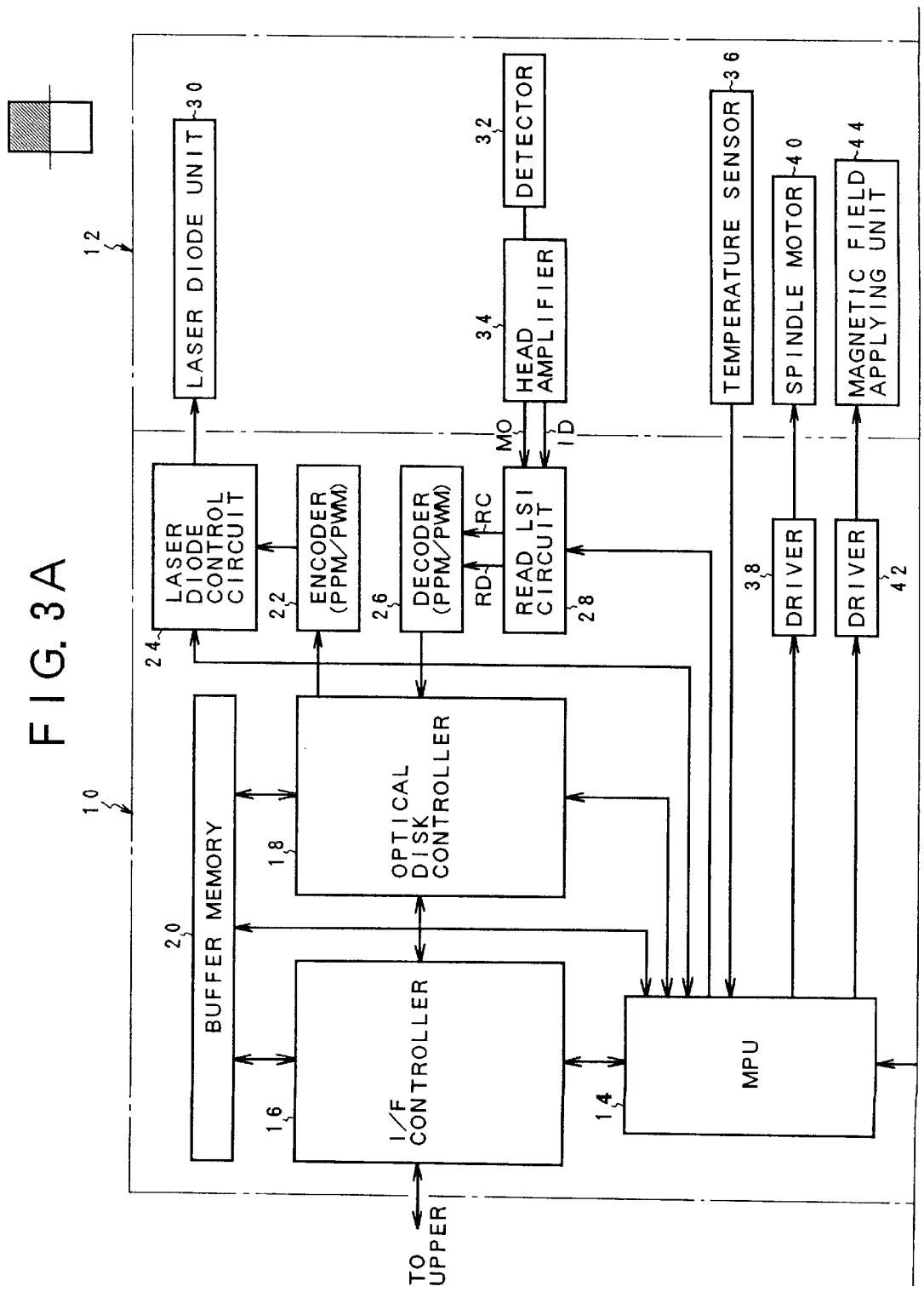
FIGS. 3A and 3B are block diagrams of an optical disk drive according to the invention.
Figure 3B:
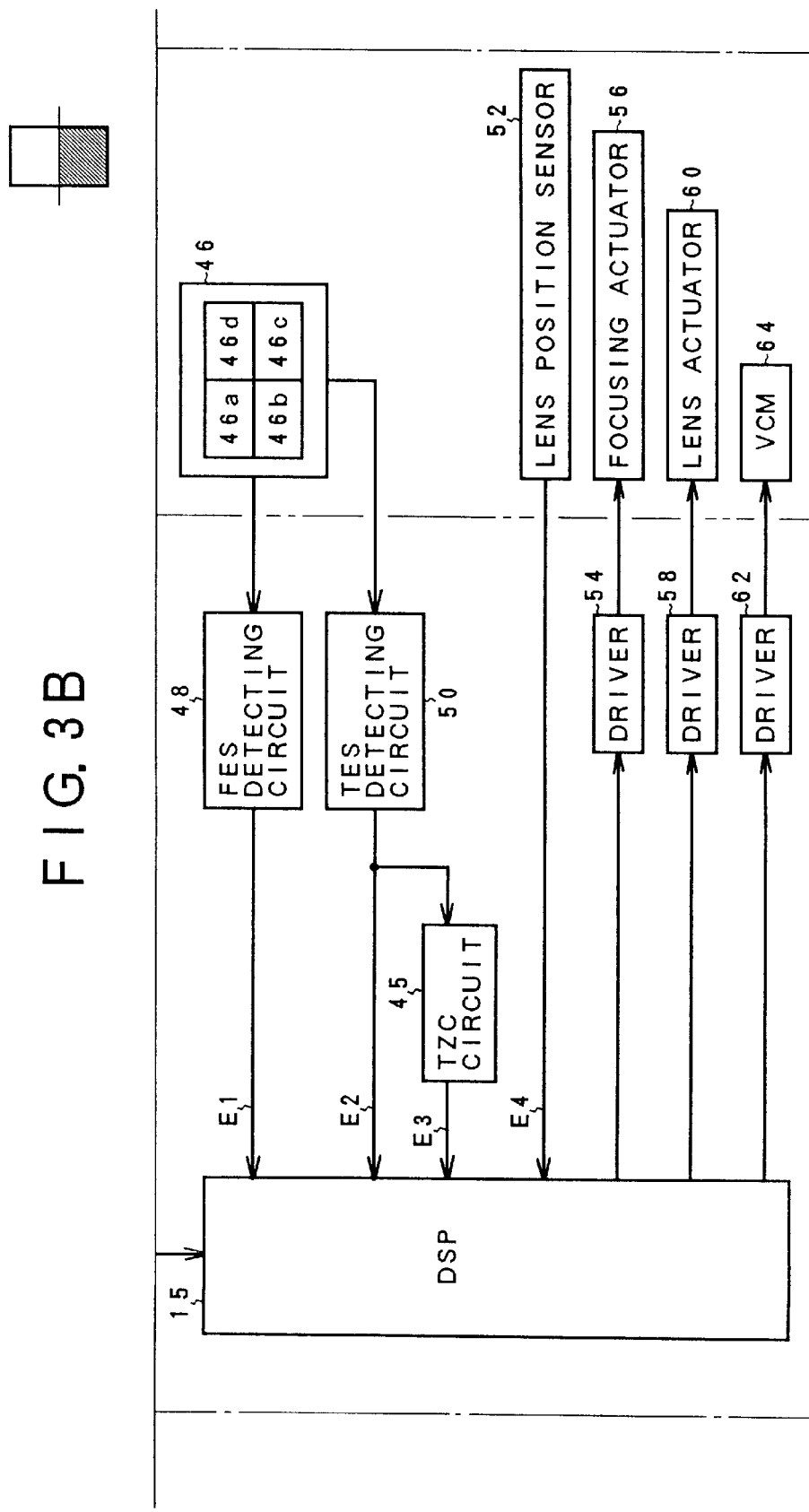

FIG. 3 is a circuit block diagram of an optical disk drive as an optical storage apparatus of the invention. The optical disk drive of the invention is constructed by a controller 10 and an enclosure 12. The controller 10 has: an MPU 14 for controlling the whole optical disk drive; an interface controller 16 for transmitting and receiving a command and data to/from an upper apparatus; an optical disk controller 18 for performing a formatting process of write data to an optical disk medium and an ECC process to read data; and a buffer memory 20 which is commonly used by the MPU 14, interface controller 16, and optical disk controller 18. An encoder 22 and a laser diode control circuit 24 are provided as a writing system for the optical disk controller 18. A control output of the laser diode control circuit 24 is supplied to a laser diode unit 30 provided for an optical unit on the enclosure 12 side. The laser diode unit 30 integratedly has a laser diode and a photosensitive device for monitoring. As an optical disk for recording and reproducing by using the laser diode unit 30, that is, as a rewritable MO cartridge medium, any one of a magnetooptical recording medium having a reproducing layer, a switching layer, and a recording layer of an FAD system of FIG. 1 (hereinbelow, called an "FAD medium"), a magnetooptical recording medium having a reproducing layer and a recording layer of an RAD system of FIG. 2 (hereinbelow, called an "RAD medium"), and the like can be used in the embodiment. As a recording method of the medium, a pit position recording (PPM recording) in which data is recorded in correspondence to the presence or absence of a mark on the medium or a pulse width recording (PWM recording, or also called a pulse train recording) in which edges, namely, front and rear edges of a mark are made correspond to data is used. As a recording format, a ZCAV such that the medium is divided into a plurality of zones is used. When an MO cartridge is loaded into the optical disk drive, an ID portion of the medium is first read, the kind of medium is recognized by the MPU 14 from the pit interval, and the recognition result of the kind is notified to the optical disk controller 18, thereby executing a formatting process corresponding to the medium capacity and the PPM or PWM recording. As a reading system for the optical disk controller 18, a decoder 26 and a read LSI circuit 28 are provided. A photosensitive signal of a return light of a beam from the laser diode unit 30 received by a detector 32 provided for the enclosure 12 is inputted as an ID signal and an MO signal to the read LSI circuit 28 via a head amplifier 34. The read LSI circuit 28 has circuit functions of an AGC circuit, a filter, a sector mark detecting circuit, a synthesizer, a PLL, and the like. The read LSI circuit 28 forms a read clock and read data from the inputted ID signal and MO signal and outputs them to the decoder 26. Since the zone CAV is used as a recording method of a medium by a spindle motor 40, a switching control of a clock frequency corresponding to a zone is executed to the built-in synthesizer by the MPU 14 for the read LSI circuit 28. A modulating method of the encoder 22 and a demodulating method of the decoder 26 are switched to the modulating and demodulating methods of the PPM recording or PWM recording in accordance with the medium kind recognized by the optical disk controller 18. A detection signal of a temperature sensor 36 provided on the enclosure 12 side is supplied to the MPU 14. On the basis of an environmental temperature in the apparatus detected by the temperature sensor 36, the MPU 14 controls each of the light emitting powers for reading, writing, and erasing in the laser diode control circuit 24 to an optimum value. The MPU 14 controls the spindle motor 40 provided on the enclosure 12 side by a driver 38. Since the recording format of the MO cartridge is ZCAV, the spindle motor 40 is rotated at a constant velocity of, for example, 3600 rpm. The MPU 14 also controls a magnetic field applying unit 44 provided on the enclosure 12 side via a driver 42. The magnetic field applying unit 44 is arranged on the side opposite to the beam irradiating side of the MO cartridge loaded in the apparatus and supplies an external magnetic field to the medium at during recording, erasing, and reproducing operations. As a magnetic field applying unit 44, although an electromagnet is usually used, a permanent magnet by which an optimum magnetic field determined by a correcting process of the invention is obtained can be used, or further, a combination of an electromagnet and a permanent magnet can be also used as another means. An external magnetic field at the time of reproduction by the magnetic field applying unit 44 is the reproducing magnetic field Hr with respect to the FAD medium and is an initializing magnetic field Hi with respect to the RAD medium. Further, the external magnetic field by the magnetic field applying unit 44 at the time of reproduction is always corrected to an optimum magnetic field by a reproducing magnetic field correcting unit realized as a processing function of the MPU 14 in the invention.

A DSP 15 has a function as a servo controller for positioning the beam from the laser diode unit 30 to the medium. For this purpose, a 4-split detector 46 for receiving the beam return light from the medium is provided for the optical unit on the enclosure 12 side and an FES detecting circuit (focusing error signal detecting circuit) 48 generates a focusing error signal E1 from photosensitive outputs of the 4-split detector 46 and supplies it to the DSP 15. When photosensitive signals of photosensing units 46a, 46b, 46c, and 46d of the 4-split detector 46 assume Ea, Eb, Ec, and Ed, the focusing error signal E1 is detected as follows.

$$E1=(Ea+Ec)-(Eb+Ed)$$

The focusing error signal E1 is supplied to the DSP 15 and a feedback control of a focusing actuator 56 for minimizing the focusing error signal E1 is executed in an automatic focusing control unit realized by the DSP 15. The automatic focusing control unit realized by the DSP 15 obtains an offset value (target value) serving as an optimum focal point while sequentially moving a position of an objective lens in a state where a control loop is turned off, sets the offset value of the optimum focal point to an automatic focusing control loop, and is feedback controlled so as to minimize the focusing error signal E1 by using the position (optimum focal point) of the objective lens determined by the offset value as a reference. The offset value which provides the optimum focal point is determined on the basis of any one of the following three lens positions: a lens position where a tracking error signal E2 is maximum; a lens position where an RF reproduction signal is maximum; and a lens position where a sum signal of the 4-split detector 46 is maximum. A TES detecting circuit (tracking error signal detecting circuit) 50 generates the tracking error signal E2 from the photosensitive outputs of the 4-split detector 46 and transmits it to the DSP 15. That is, when the photosensitive signals of the photosensing units 46a, 46b, 46c, and 46d of the 4-split detector 46 are called Ea, Eb, Ec, and Ed, the tracking error signal E2 is expressed as follows.

$$E2=(Ea+Eb)-(Ec+Ed)$$

The tracking error signal E2 is inputted to a TZC circuit (track zero-cross point detecting circuit) 45 and a track zero-cross pulse E3 is generated and inputted to the DSP 15. Further, a lens position sensor 52 for detecting a lens position of the objective lens for irradiating the laser beam to the medium is provided on the enclosure 12 side and a lens position detection signal (LPOS) E4 of the lens position sensor 52 is inputted to the DSP 15. The DSP 15 drives the focusing actuator 56, a lens actuator 60, and a VCM 64 via drivers 54, 58, and 62 for positioning the beam.

FIG. 4 schematically shows the enclosure in the optical disk drive. The spindle motor 40 is provided in a housing 66. By inserting an MO cartridge 70 from the side of an inlet door 68 into a hub of a rotary shaft of the spindle motor 40, a loading such that an MO medium 72 in the MO cartridge 70 is attached to the hub of the rotary shaft of the spindle motor 40 is performed. A carriage 76 which is movable in the direction traversing the medium tracks by the VCM 64 is provided below the MO medium 72 of the loaded MO cartridge 70. An objective lens 80 is mounted on the carriage 76 and a beam from a semiconductor laser provided for a fixed optical system 78 enters the objective lens 80 via a prism 82 and a beam spot is formed on the surface of the MO medium 72. The objective lens 80 is moved in the optical axial direction by the focusing actuator 56 shown in the enclosure 12 in FIG. 3 and can be also moved in a radial direction traversing the medium tracks within a range of, for example, tens of tracks by the lens actuator 60. The position of the objective lens 80 mounted on the carriage 76 is detected by the lens position sensor 52 in FIG. 3. The lens position sensor 52 sets the lens position detection signal to zero at a neutral position where the optical axis of the objective lens 80 is directed right overhead and generates the lens position detection signal E4 according to movement amounts having different polarities for the movement to the outer side and the movement to the inner side. Further, the magnetic field applying unit 44 which is long in the radial direction is arranged so as to face the opposite side of the beam irradiating surface of the medium 72. The magnetic field applying unit 44 can also have a sliding structure such that it is mounted on the carriage 76 and applies the external magnetic field to the beam irradiating position of the medium 72.

FIG. 5 is a functional block diagram of a reproducing magnetic field correcting process which is realized by the processing function of the MPU 14 in FIG. 3 with respect to the FRD medium in FIG. 1 as an example and which is used to correct a reproducing magnetic field generated by the driving of the magnetic field applying unit to an optimum value. A reproducing magnetic field correcting unit 100 realized by the processing function of the MPU 14 has: a correction timing discriminating unit 102; a correction processing unit 104; a reproducing magnetic field storage table 106; and a reproducing magnetic field setting unit 108. The correction timing discriminating unit 102 sets a processing timing of the reproducing magnetic field correcting process in accordance with the set contents stored in a register group 110 and activates the correction processing unit 104. An initialization diagnosing instruction, the medium insertion detection, the temperature in the apparatus, an upper interrupting request, and a retrying instruction have been registered in the register group 110. The registered contents are read by the correction timing discriminating unit 102 and the correction processing unit 104 is activated. The correction processing unit 104 is activated by the correction timing discriminating unit 102, for example, at the time of the initialization diagnosis in association with the turn-on of the power source of the apparatus, at the time of detection of the loading by the insertion of the storage medium to be processed into the apparatus, at a timing when a change in temperature in the apparatus becomes a predetermined value or larger, at a timing when an elapsed time from the whole correcting process is monitored and a predetermined correction valid time elapses, at a timing when a reproduction error occurs and a retrying process is executed, and the like. In addition, the correcting process of the correction processing unit 104 can be also activated by the correction timing discriminating unit 102 by setting a dip switch or the like at the time of start-up in a factory when the apparatus is completed at a factory stage and is shipped. The correction timing discriminating unit 102 can also activate the correction processing unit 104 by a command from the upper apparatus. Further, when the upper interrupting request for reading or writing is received from the upper apparatus, the correction timing discriminating unit 102 discriminates whether the correction processing unit 104 is processing or not. If the correction processing unit 104 is executing the correcting process, the correcting process is temporarily interrupted, and an access by the upper interrupting request is preferentially performed. After completion of the process of the interrupting request, the correction processing unit 104 is restarted from the interrupted time point. The correction processing unit 104 is made operative by receipt of an activating request of the correcting process from the correction timing discriminating unit 102 and performs a test writing of a test pattern which is used for the correcting process to a designated position of the optical storage medium. After that, a reproducing state is discriminated from a reproduction signal obtained from a reproducing unit while changing step by step the reproducing magnetic field by changing a driving current to be supplied to the driver 38 serving as a magnetic field applying unit using, for example, an electromagnet. An electromagnetic current corresponding to the reproducing magnetic field in a reproducible state is obtained and is stored into the reproducing magnetic field storage table 106. The correcting process of the reproducing magnetic field by the correction processing unit 104 is executed every zone of the optical storage medium. The electromagnet current which can generate an optimum reproducing magnetic field every zone is registered into the reproducing magnetic field storage table 106.

FIG. 6 shows the reproducing magnetic field storage table 106. For example, an optical storage medium maybe divided into 11 zones. As shown by a zone No. i. Electromagnet currents Iz1 to Iz11 which provide the optimum reproducing magnetic field obtained by the reproducing magnetic field correcting process are store for each zone. It is desirable the optimum reproducing magnetic field be calculated for the first or final track of each zone. The magnetic field optimization is calculated in the first or final track of each zone merely to simplify the calculation performed by the reproducing magnetic field setting unit 108 in FIG. 5 with reference to the reproducing magnetic field storage table 106.

Figure 7:
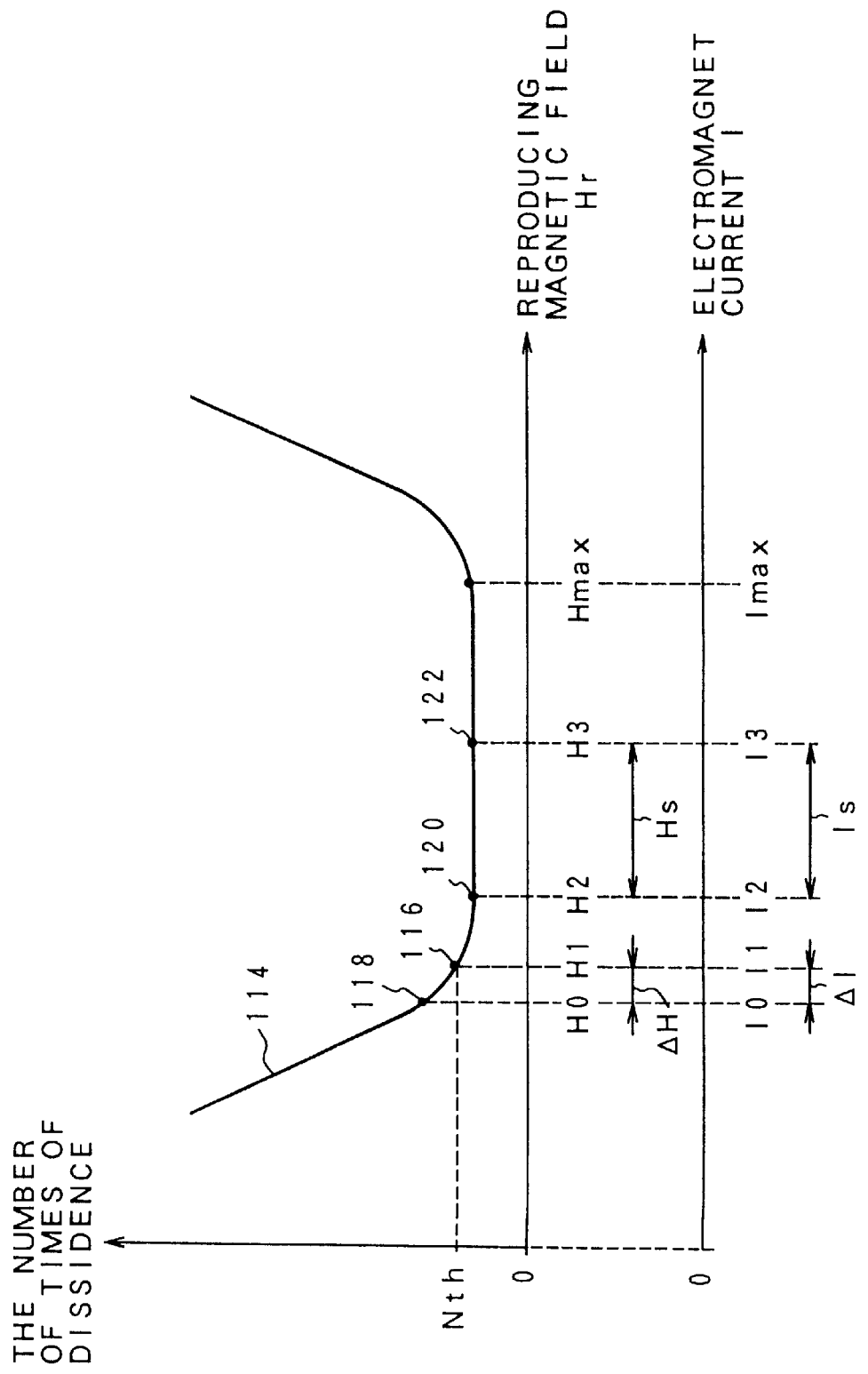
FIG. 7 is a characteristics diagram of the number of times of dissidence (reproducing state) to changes in reproducing magnetic field and electromagnet current in a reproducing magnetic field correcting process in FIG. 5.

FIG. 7 shows a procedure for the reproducing magnetic field correcting procedure by the correction processing unit 104 in FIG. 5. An axis of abscissa indicates the reproducing magnetic field Hr that is changed step by step and an axis of ordinate shows the number of times of dissidence by the bit comparison of the reproduction data. First, the number of times of dissidence of the reproduction data to a change in reproducing magnetic field Hr has a shape shown by a straight line 114. That is, when the reproducing magnetic field Hr is low, the number of times of dissidence is large. In this state, when the reproducing magnetic field Hr is increased, the number of times of dissidence decreases. When the reproducing magnetic field reaches a certain critical level, the number of times of dissidence becomes almost constant. See e,g., point 116. When the reproducing magnetic field Hr is further increased in this state, the number of times of dissidence again starts to increase from a time point exceeding a certain value. It is desirable to set the optimum reproducing magnetic field to a value near an almost center point 122 of a flat portion where the number of times of dissidence keeps the lowest value. The characteristics 114 of FIG. 7 are experimentally obtained by setting an environmental temperature in the apparatus to, for example, a room temperature 25° C. While increasing the reproducing magnetic field Hr in the characteristics 114, a reproducing magnetic field H1 at point 116 where it decreases to a predetermined threshold value Nth of the number of times of dissidence is set as an initial value of the reproducing magnetic field correcting process. As for an increase in reproducing magnetic field Hr, it is sufficient to increase it from the reproducing magnetic field initial value H1 set in correspondence to the point 116 at a front position of the shoulder of the characteristics 114 by a predetermined value at a time step by step. However, since the characteristics 114 are shifted in the direction of the axis of abscissa in dependence on the temperature, the reproducing magnetic field initial value H1 doesn't always correspond to the point 116 of the shoulder of the characteristics 114 in accordance with the apparatus temperature at that time. In the reproducing magnetic field correcting process of the invention, therefore, a reproducing magnetic field H0 in which the reproducing magnetic field initial value H1 is reduced by only a predetermined value ΔH is set to the lowest value, and the reproducing magnetic field Hr is increased step by step. By setting the value which is lower than the reproducing magnetic field initial value H1 by only ΔH to the lowest value of the reproducing magnetic field correcting process as mentioned above, even if the characteristics 114 are shifted in the direction of the reproducing magnetic field due to the temperature, the starting position of the reproducing magnetic field correcting process can be set to a portion which exceeds the shoulder of the characteristics and where the number of times of dissidence is larger than the threshold value Nth. By increasing the reproducing magnetic field step by step from this portion, the shoulder portion in the characteristics 114 can be certainly detected. In FIG. 7, while increasing the reproducing magnetic field step by step from the lowest reproducing magnetic field H0, the number of times of dissidence at that time is obtained. A first point 120 where the number of times of dissidence is equal to or less than the threshold value Nth and is not decreased anymore is detected. If the first point 120 where the change in number of times of dissidence decreased can be detected as mentioned above, on the basis of a width of the characteristics 114 in the reproducing magnetic field direction in which the number of times of dissidence is lowest for a reproducing magnetic field H2 at point 120, the point 122 of the characteristics 114 which provide a reproducing magnetic field H3 added with only a predetermined value Hs is set to an optimum reproducing magnetic field. In the actual process, an electromagnet current I which is supplied to the driver 38 serving as a magnetic field applying unit is treated instead of the reproducing magnetic field Hr. That is, the electromagnet current is increased step by step from a lowest electromagnet current I0 that is lower than a preset electromagnet current initial value I1 by a predetermined value ΔI. An electromagnet current I2 corresponding to the first discrimination point 120 where the number of times of dissidence is equal to or less than the threshold value Nth and doesn't decrease any more is detected. A current I3 obtained by adding an electromagnet current Is corresponding to the predetermined value Hs obtained from a flat portion in which the number of times of dissidence of characteristics 112 is the lowest value, namely, $$I3=I2+Is$$

is registered into the reproducing magnetic field storage table 106 in FIG. 4 as an electromagnet current which gives an optimum reproducing magnetic field H3. When the reproducing magnetic field Hr is too strong in the reproducing magnetic field correcting process, the data stored in the medium is deleted. To prevent such a situation, an upper limit reproducing magnetic field Hmax is set into the reproducing magnetic field Hr which is used for the correcting process. Therefore, the electromagnet current I is also limited by an upper limit current Imax corresponding to it.

Figure 8A:
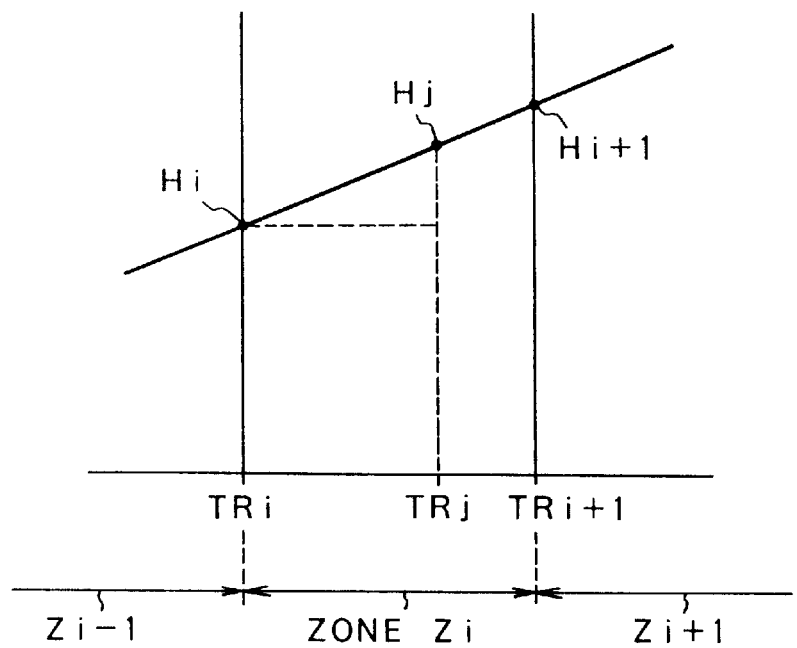
FIGS. 8A and 8B are explanatory diagrams for a linear interpolation by a reproducing magnetic field setting unit in FIG. 5.
Figure 8B:
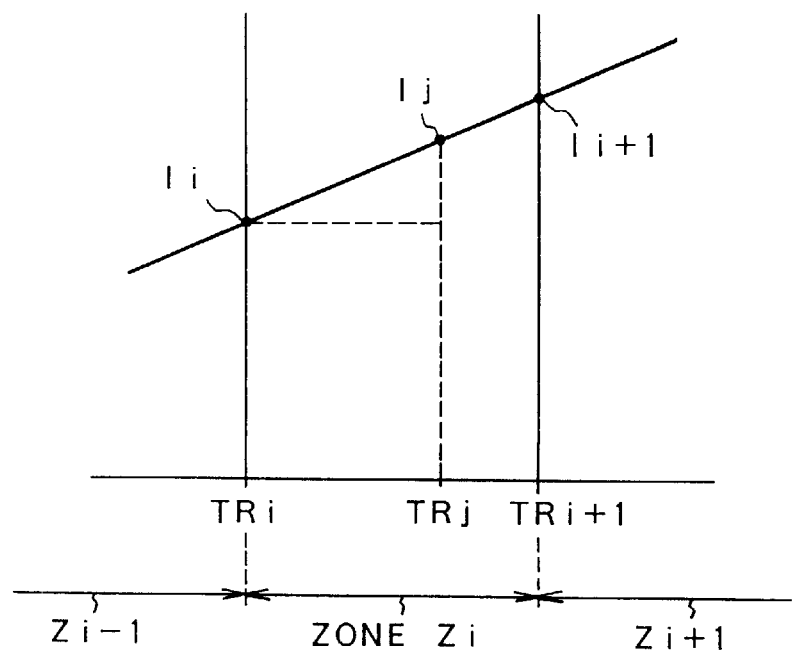

FIGS. 8A and 8B show a process for obtaining, by a linear interpolation, an electromagnetic wave driving current of the reproducing magnetic field corresponding to the actual access track from the reproducing magnetic field stored on a zone unit basis into the reproducing magnetic field storage table 106 which is executed by the ordinary reproducing process which is executed after the correcting process by the reproducing magnetic field setting unit 108 in FIG. 5 was finished, namely, from the electromagnet current corresponding to the reproducing magnetic field. A track number HH, a sector number SS, and further, a zone No. Zi based on the kind of medium, a temperature (T) in the apparatus, and a reproducing command are register set into the reproducing magnetic field setting unit 108 in FIG. 5 by a register group 112. The reproducing magnetic field setting unit 108 calculates an electromagnet current which gives a necessary optimum reproducing magnetic field to the access position by the linear interpolation based on the set information in the register group 112, thereby outputting a magnetic field generation current signal E13. FIG. 8A shows a calculating principle by the linear interpolation of an optimum magnetic field Hj when a track number TRj in a zone Zi is designated. First in the embodiment, the optimum magnetic field Hi has been registered into the reproducing magnetic field storage table 106 with respect to a head track number TRi of the zone Zi serving as an access target. With respect to a track number TRi+1 at the head position of a next zone Zi+1, an optimum magnetic field Hi+1 has been also similarly registered. Actually, electromagnet currents Ii and Ii+1 which are supplied to the driver 38 serving as a magnetic field applying unit have been stored as shown in FIG. 8B instead of the optimum magnetic fields. The optimum magnetic field Hj of the track number TRj belonging to a zone Zi in this instance can be calculated by the following linear interpolation equation.

$$Hj=Hi+\{(Hi+1-Hi)/n\}\cdot\{(TRj-TRi)/n\} \quad (1)$$

Since the linear interpolation equation is actually given by the electromagnet current I in FIG. 8B, $$Ij=Ii+\{(Ii+1-Ii)/n\}\cdot\{(TRj-TRi)/n\} \quad (2)$$

In FIGS. 8A and 8B, the electromagnet current of the optimum magnetic field at the head track number of each zone has been registered in the reproducing magnetic field storage table 106. However, the final track of each zone or the center track of the zone can be also used.

Figure 9:
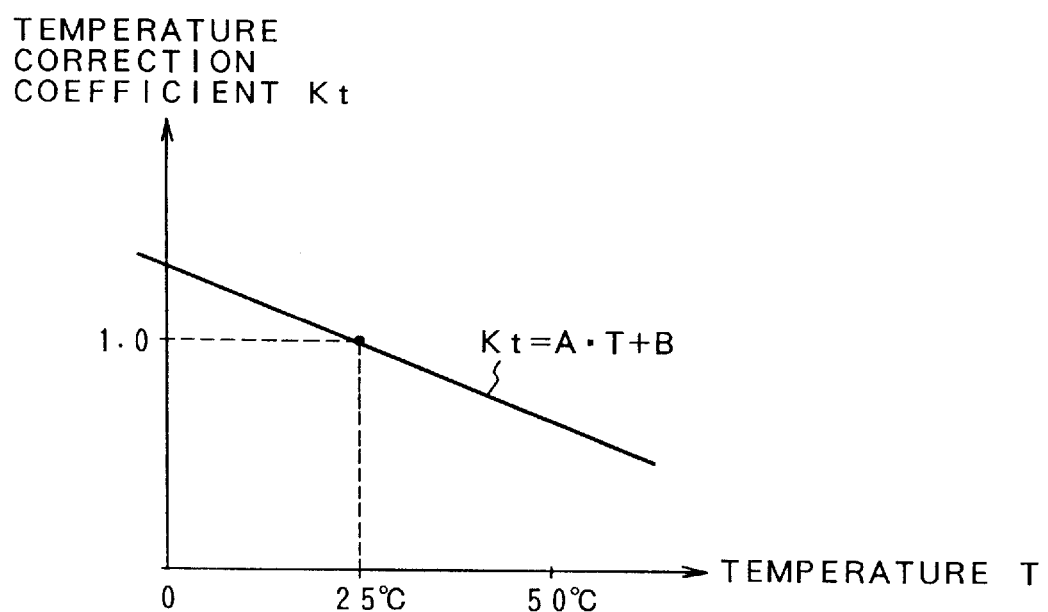
FIG. 9 is an explanatory diagram of a temperature correction coefficient by the reproducing magnetic field setting unit in FIG. 5.

FIG. 9 is a characteristics diagram of a correcting process, due to the temperature (T) in the apparatus, of the electromagnet current which gives the optimum magnetic field corresponding to the access position of the medium which is obtained by the reproducing magnetic field setting unit 108 in FIG. 5. This diagram shows the characteristics of a temperature correction coefficient Kt to correct the electromagnet current which gives the optimum magnetic field corresponding to the access position obtained by the linear interpolation in FIGS. 8A and 8B for the temperature (T) in the apparatus on the axis of abscissa. The temperature correction coefficient Kt is given by $$K=A\cdot T+B$$

and generally has a negative temperature coefficient. When the temperature in the apparatus is equal to 25° C., the temperature correction coefficient Kt is set to Kt =1.0. The correction of the optimum magnetic field Hr using the temperature correction coefficient Kt which is given by FIG. 9 is calculated as $$Hr=Hr\{1-Kt \times (T-25° C.)\}$$

Figure 10A:
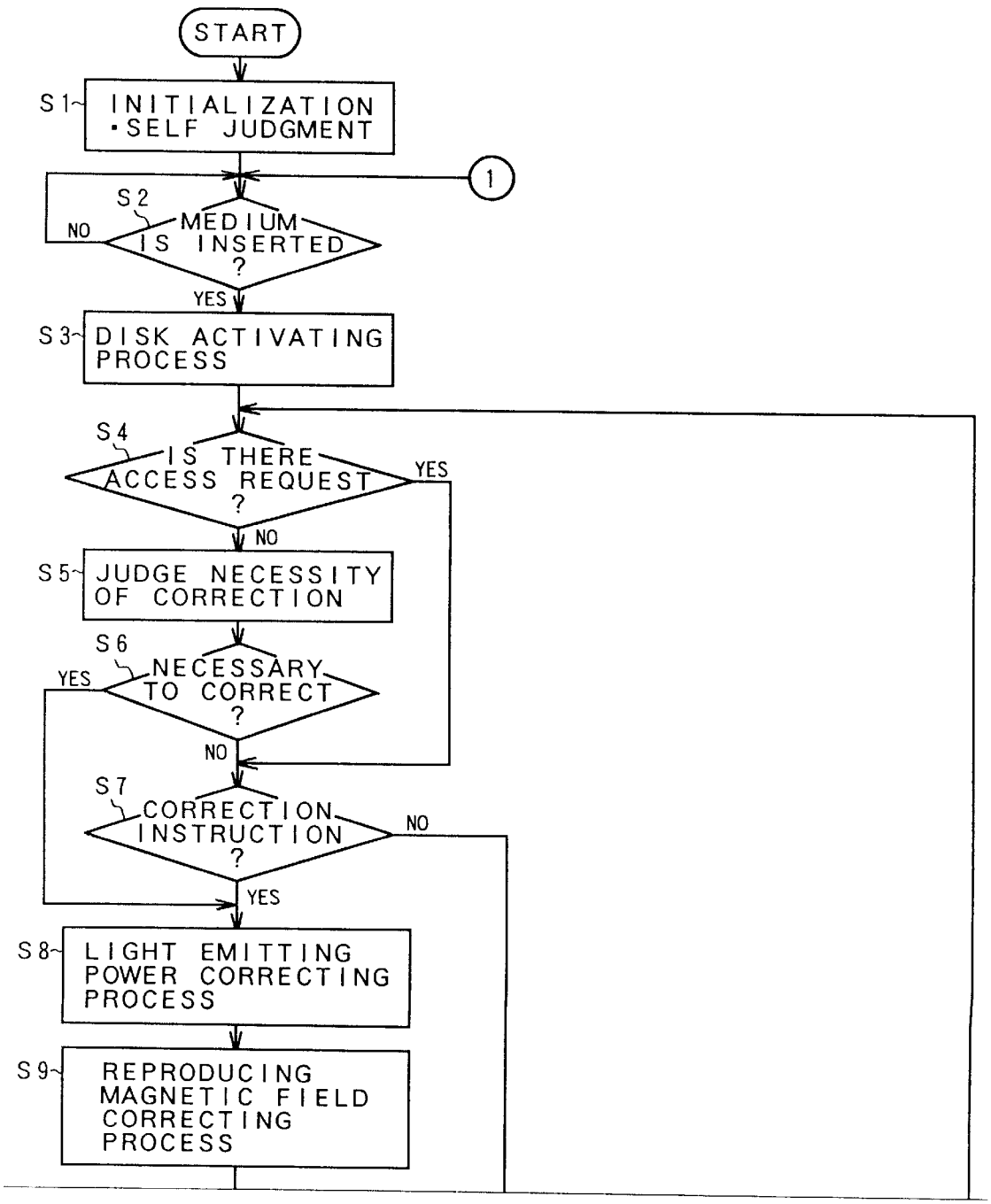
FIGS. 10A and 10B are flowcharts for the processing operation of the invention including the reproducing magnetic field correcting process.
Figure 10B:
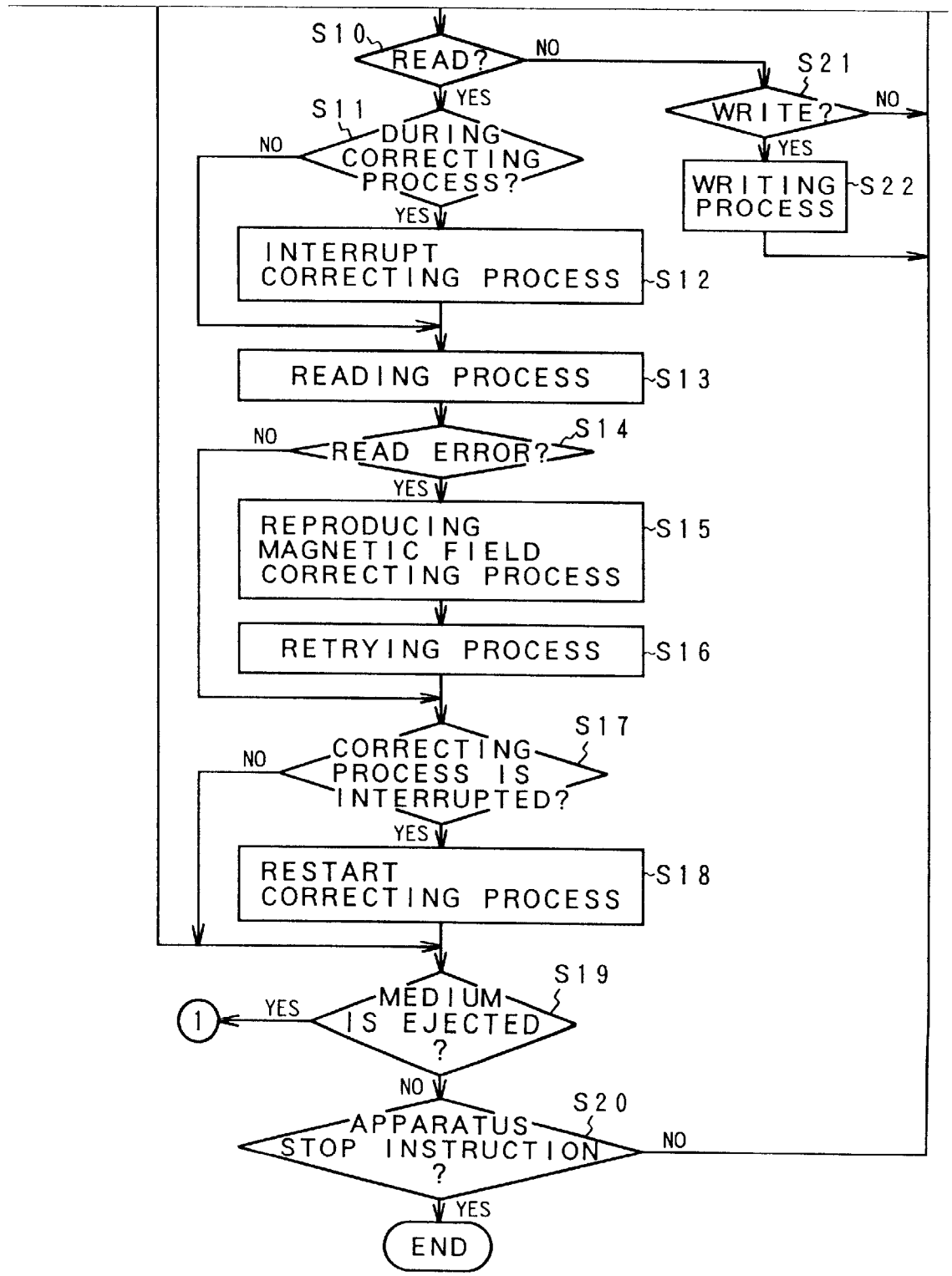

A process of an optical storage apparatus of the invention having the processing function of the reproducing magnetic field correcting unit 100 in FIG. 5 will now be described. FIGS. 10A and 10B are flowcharts for the whole process of the optical storage apparatus of the invention. When a power source of the apparatus is turned on, an initialization and a self diagnosing process are executed in step S1. The apparatus waits for the insertion of a medium in step S2. When the medium is inserted in this state, step S3 follows and a disk activating process is executed. The disk activating process in step S3 is as shown in a flowchart of FIG. 11. First, the medium is loaded in step S1 and is set to a spindle motor as shown in FIG. 4 and is rotated at a constant velocity. In step S2, a correction request flag FL is set. In step S3, the present time is initialized. Further in step S4, the present temperature (T) in the apparatus is detected and a necessary process is finished in order to determine a light emitting power of the laser diode and a reproducing magnetic field by the magnetic field applying unit upon activation.

Referring again to FIG. 10A, when the disk activating process in step S3 is finished, step S4 follows and the presence or absence of an accessing request from the upper apparatus is checked. In the embodiment, even if the disk activating process is performed by the medium loading, the correcting process of the light emitting power and the reproducing magnetic field is not executed at that time point, but when a correction instructing command that is first generated from the upper apparatus which received a notification of the disk activating process is received, the first correcting process of the light emitting power and the reproducing magnetic field is performed. Therefore, the accessing request that is first received from the upper apparatus in step S4 is the correction instructing command. When it is determined in step S7 that the accessing request is the correcting instruction, the correcting process of the light emitting powers such as writing power, erasing power, reading power, and the like is executed in step S8. After that, the reproducing magnetic field correcting process is performed by the reproducing magnetic field correcting unit 100 in FIG. 5 in step S9. When there is no correcting instruction from the upper apparatus, a necessity of the correction is discriminated in step S5. When the necessity of the correction is decided in step S6 on the basis of a discrimination result, the light emitting power correcting process in step S8 and the reproducing magnetic field correcting process in step S9 are executed. When a read accessing request is received from the upper apparatus, step S10 follows and a reading request is discriminated. A reading process in step S11 and subsequent steps are executed. In the reading process, a check is first made in step S11 to see if the correcting process is being executed. When the correcting process is being performed, the correcting process is temporarily interrupted in step S12. The reading process is carried out in step S13. After completion of the reading process, the presence or absence of a read error is checked in step S14. If there is a read error, the reproducing magnetic field correcting process is executed in step S15. After that, a retrying process is performed in step S16. When there is no read error, step S17 follows and a check is made to see if the correcting process has been interrupted. If the correcting process has been interrupted, the correcting process is restarted from the interrupted time point in step S18. After completion of the series of reading processes as mentioned above, a check is made in step S19 to see if the medium has been ejected. When the medium is not ejected, the presence or absence of an apparatus stop instruction is discriminated in step S20. After that, the processing routine is returned to step S2 and similar processes are repeated after waiting for the next medium insertion. On the other hand, when there is a write accessing request from the upper apparatus, step S21 follows and a writing request is discriminated. A writing process is carried out in step S22.

Figure 12A:
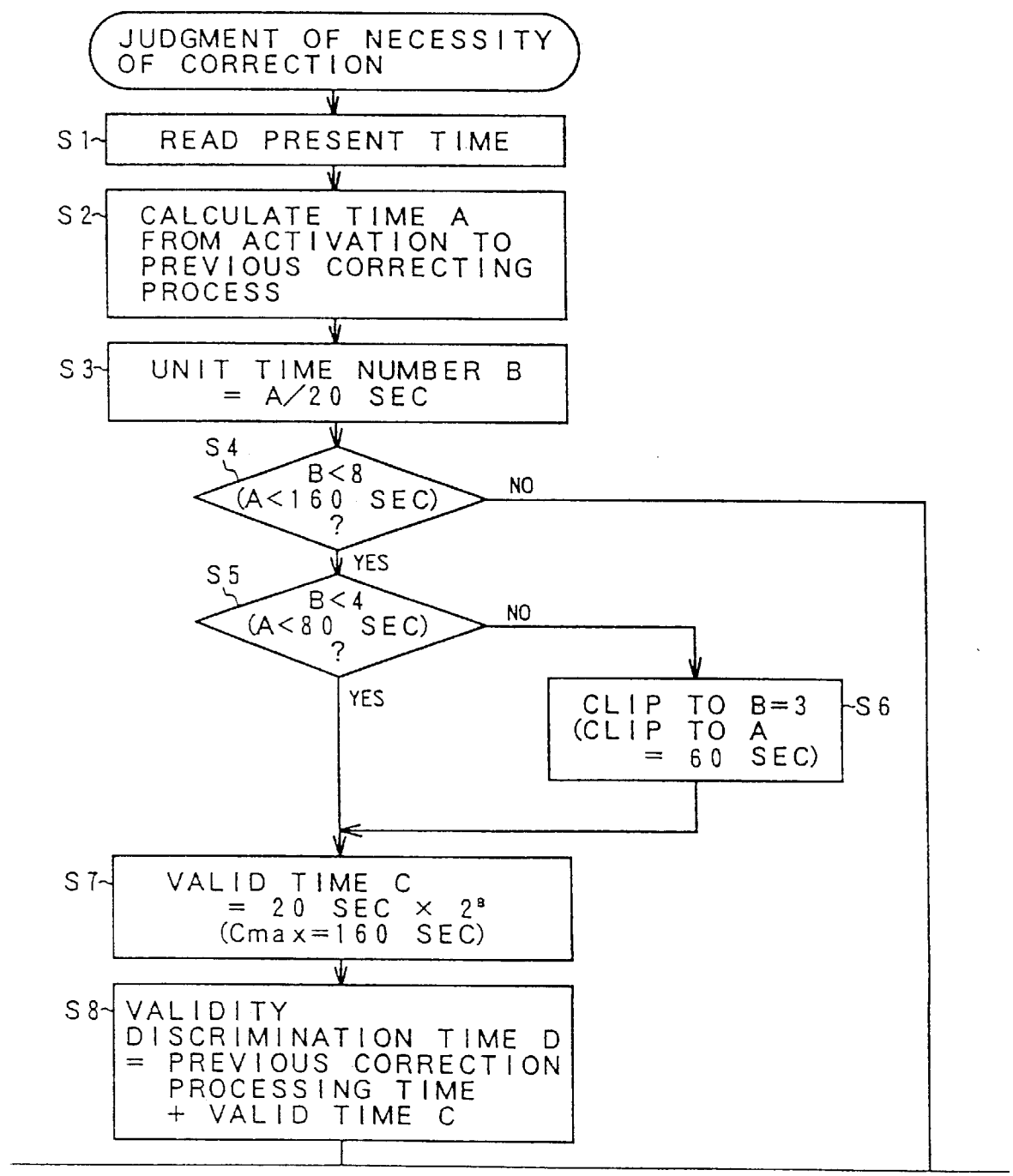
FIG. 12 is a flowchart for a discrimination about the necessity of the correcting process in FIG. 10.

FIGS. 12A and 12B are flowcharts for a discriminating process about the necessity of the correction in step S5 in FIG. 10A. In the necessity discriminating process of the correction, first in step S1, the present time is read. In step S2, a time (A) that is required from the activation of the optical disk drive to the previous correcting process is calculated. In step S3, the time (A) from the activation is divided by a predetermined time, for example, 20 seconds, thereby converting into a unit time number (namely, the number of unit times) (B). In step S4, a check is made to see if the unit time number (B) is less than 8, namely, whether the time (A) from the activation to the first test writing is less than 160 seconds or not. When the time (A) is less than 160 seconds, step S5 follows and a check is made to see if the unit time number (B) is less than 4, namely, whether the time (A) is less than 80 seconds or not. When the time (A) lies within a range from 80 seconds to 160 seconds, the unit time number (B) is clipped to 3, namely, the time (A) is clipped to 30 seconds in step S6 and step S7 follows. When the time (A) is less than 80 seconds in step S5, the processing routine directly advances to step S7. In step S7, a valid time (C) to guarantee the use of the optimum value (light emitting power and reproducing magnetic field) determined in the previous correcting process is calculated. In this case, the valid time (C) is set to 20 seconds$\times 2^B$ (unit time number). The maximum value of the valid time is limited to 160 seconds. Thus, the valid time (C) to guarantee the optimum value determined by the correcting process is set to a time corresponding to $2^B$ so long as the time (A) from the activation to the first correcting process is less than 160 seconds. When it exceeds 160 seconds, the valid time (C) is fixed to the predetermined time (C=160) seconds. The calculation of the valid time (C) as mentioned above is made variable in accordance with a time which is required until the medium temperature of the medium loaded into the optical disk drive is settled to the temperature in the apparatus. That is, at the initial stage just after the medium was loaded, since there is a difference between the temperature of the medium and the temperature in the apparatus, the correction based on the temperature in the apparatus cannot be effectively performed at this stage, so that the correcting process is not executed upon activation. The temperature of the medium loaded is balanced to the temperature in the apparatus with the elapse of time of about 1 to 2 minutes. Therefore, the first correcting process is executed synchronously with a timing when a write command is first generated from the upper apparatus after the optical disk drive was activated. After the activation, since there are various timings of generation of the write command from the upper apparatus, in steps S1 to S7 in FIG. 12, the time (A) from the activation to the first light emission adjustment is obtained, thereby deciding the valid time (C) to discriminate the next and subsequent correction timing discriminations from the time (A). When the valid time (C) can be calculated in step S7, a validity discrimination time (D) is calculated in step S8 as a time in which the calculated valid time (C) is added to the previous test writing time. In step S9, a check is made to see if the present time has exceeded the validity discrimination time (D). When the present time exceeds the validity discrimination time (D), step S14 follows and a correction processing flag is turned on. The processing routine is returned to step S6 in FIG. 10A. When the present time doesn't reach the validity discrimination time (D) in step S9, the correction processing flag is turned off in step S17. When the unit time number (B) is equal to or larger than 8, namely, is equal to or larger than 160 seconds in step S4, step S10 follows and a check is made to see if a time obtained by subtracting the previous correction processing time from the present time is less than one hour. When it is less than one hour, the present temperature is read in step S11. In step S12, a check is made to see if the present temperature lies within a range of ±3° C. from the previous temperature. If YES, the correction processing flag is turned off in step S13 and the correcting process is not performed. When there is a temperature fluctuation exceeding the range of ±3° C. for the previous temperature, the correction processing flag is turned on in step S14 and the correcting process is executed. When the difference between the present time and the previous correction processing time is equal to or larger than one hour in step S10, the correction processing flag is forcedly turned on in step S14 and the correcting process is executed. Each of the threshold times set in the necessity discriminating process of the correcting process can be properly determined as necessary.

Figure 13B:
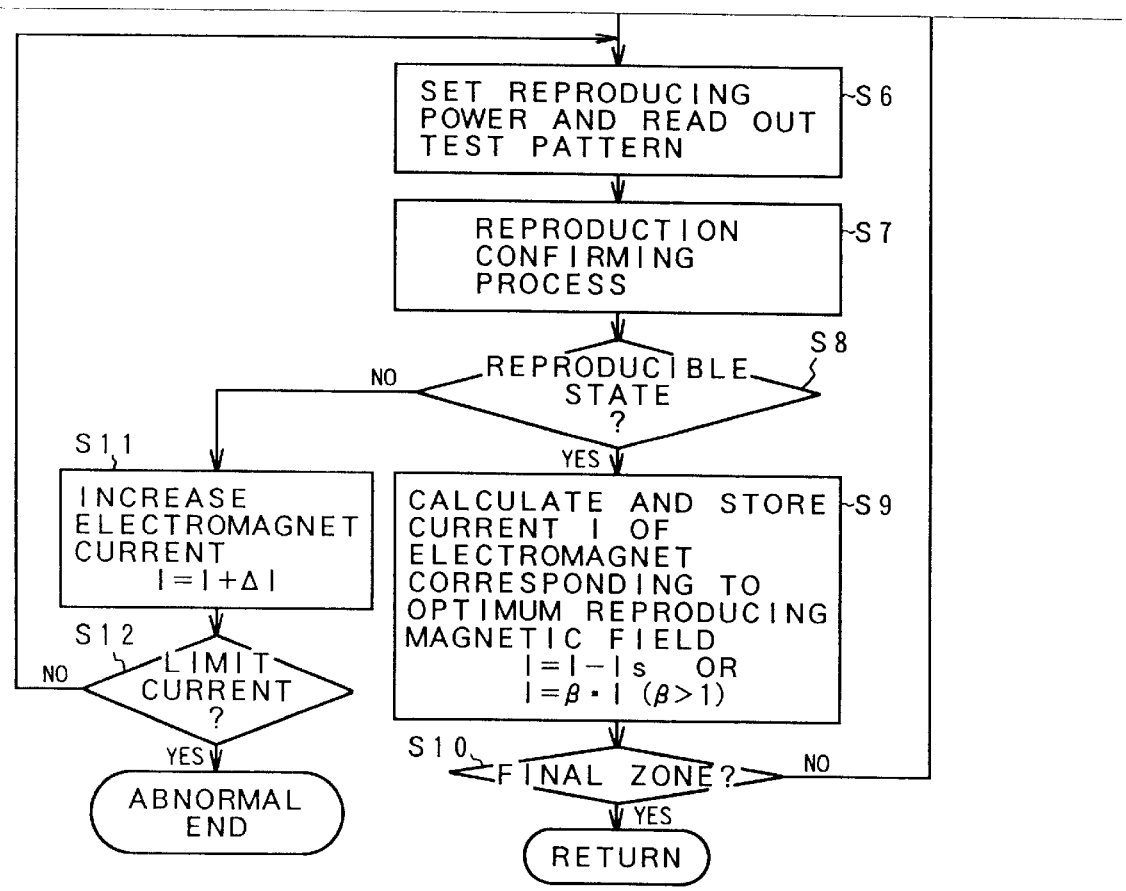

FIGS. 13A and 13B are flowcharts for the reproducing magnetic field correcting process by the correction processing unit 104 in the reproducing magnetic field correcting unit 100 in FIG. 5 which is executed in steps S9 and S15 in FIG. 10B. First in step S1, after the zone number (Z) and the track number TR were initialized to (Z=0) and (TR=0), the head is sought to the measurement track in step S2. In step S3, the recording powers for erasing and writing are set and a predetermined test pattern is test written to the measurement track. In step S4, the electromagnet current I corresponding to the initial value of the reproducing magnetic field is set. In step S5, a start current is set to a slightly low value. The setting of the slightly low start current can be accomplished by subtracting a predetermined value Δi from the initial value I of the electromagnet current or by multiplying the initial value I by a coefficient α less than 1. Thus, the electromagnet current IO in FIG. 6 is first supplied to the driver 38 as a magnetic field applying unit and the correcting process is started. In step S6, a reproducing power is set to the laser diode in a state where the reproducing magnetic field is applied and the test pattern which was test written to the measurement track is read out. A reproduction confirming process is executed in step S7. The reproduction confirming process is executed by any one of the following three methods.

I. A point that the number of times of dissidence (the number of bit errors) obtained by comparing the reproduction data and the recording data (test pattern) at the reproducing position which has previously been known on a bit unit basis is equal to or less than a predetermined value is detected, thereby deciding that the reproduction can be performed.

II. A point that a level of a peak detection signal of the RF signal reproduced from the medium return light is equal to or higher than a specified value is detected, thereby deciding that the reproduction can be performed.

III. In the ECC processing unit provided for the optical disk controller 18 in FIG. 3, a point that the number of ECC correction errors for the reproduction data is equal to or less than a predetermined value is detected, thereby deciding that the reproduction can be performed.

Other proper methods of discriminating that the reproduction can be performed can be also used. For example, an error rate can be also measured or the like. When the reproduction confirming process is executed in step S7, a check is made in step S8 to see if the apparatus is in a reproducible state. When it is in the reproducible state, a current obtained by adding, for instance, a predetermined value Is to the electromagnet current I at that time is calculated and stored as an electromagnet current which gives the optimum reproducing magnetic field in step S9. It is also possible to calculate the electromagnet current I which gives the optimum reproducing magnetic field by multiplying the electromagnet current I at that time by a predetermined coefficient β exceeding 1. When the apparatus is not in the reproducible state in step S8, step S11 follows and the electromagnet current is increased by only a predetermined value ΔI. When the current doesn't reach a limit current in step S12, the processing routine is returned to step S6. While applying the reproducing magnetic field by the increased electromagnet current, the reproducing power is set into the laser diode, the test pattern is read out, and the reproduction confirming process is executed. When there is no problem in the medium and the apparatus, by repeating the reproduction confirming process while sequentially increasing the electromagnet current in step S11, the discrimination result of the reproducible state in step S8 is derived. In step S9, the electromagnet current corresponding to the optimum reproducing magnetic field can be set. If the increased electromagnet current exceeds the limit current in step S12, the processing routine is finished as abnormality. The above processes are repeated until the final zone is discriminated in step S10 while updating the zone number and the track number in step S13. That is, the zone number Z is increased by 1 (Z=Z+1), the track number TR at that time is updated to the head track number of the next zone by adding the number of tracks (N) per zone, and the head is sought to the measurement track in step S2.

FIG. 14 is a flowchart for the electromagnet current setting process of the optimum magnetic field corresponding to the access position by the reproducing magnetic field setting unit 108 in FIG. 5 which is executed in the ordinary reading process after the correcting process of the reproducing magnetic field in FIGS. 13A and 13B was finished. First in step S1, the zone number Zi is calculated from the track number TRj serving as an access position. In step S2, the reproducing magnetic field Hi of the zone head track number Tr1 of the corresponding zone is fetched by the zone number Zi with reference to the reproducing magnetic field storage table 106. In step S3, the reproducing magnetic field Hi+1 of the head track number TRi+1 of the adjacent zone number Zi+1 is fetched. In step S4, the reproducing magnetic field Hr is obtained by the linear interpolation according to the equation (1). The calculating process of the reproducing magnetic field Hr by the linear interpolation in steps S1 to S4 corresponds to FIG. 8A. However, actually, the electromagnet current Ij to generate the optimum reproducing magnetic field Hr at the access track number is calculated by the equation (2) by using the electromagnet current I as shown in FIG. 8B. In step S5, the temperature correction coefficient Kt is calculated from the temperature (T) in the apparatus in accordance with the characteristics of FIG. 8B. In step S6, the reproducing magnetic field Hj is corrected by the temperature coefficient Kt. In step S7, the reproducing magnetic field Hj after completion of the temperature correction is converted to a driving current Ij of the magnetic field applying unit. This driving current is outputted. It will be obviously understood that if the correction of the temperature coefficient in step S6 is calculated from $$Ij = Ij\{1 - Kt(T - 25^\circ \text{ C.})\}$$

with respect to the electromagnet current Ij which gives the reproducing magnetic field Hj, the process in step S7 is unnecessary.

According to the invention as mentioned above, with respect to the reproduction using the external magnetic field of the optical storage medium having the recording layer for recording data onto the board and the reproducing layer for reproducing the data recorded in the recording layer, the reproducing process is executed while changing the reproducing magnetic field and the current which gives the optimum reproducing magnetic field is obtained. Therefore, a situation such that the reproducing magnetic field is too strong and the mask portion is widened, so that the recording data cannot be read out or the recording data is deleted can be certainly prevented. The current which is supplied to the magnetic field applying unit can be suppressed to the current of the necessary minimum limit which gives the optimum reproducing magnetic field, so that the electric power consumption of the apparatus can be also reduced. Further, a situation such that the reproducing magnetic field is too weak and the mask portion is narrowed, so that an error occurs in a crosstalk with the adjacent pit can be also certainly prevented.

Figure 1A:
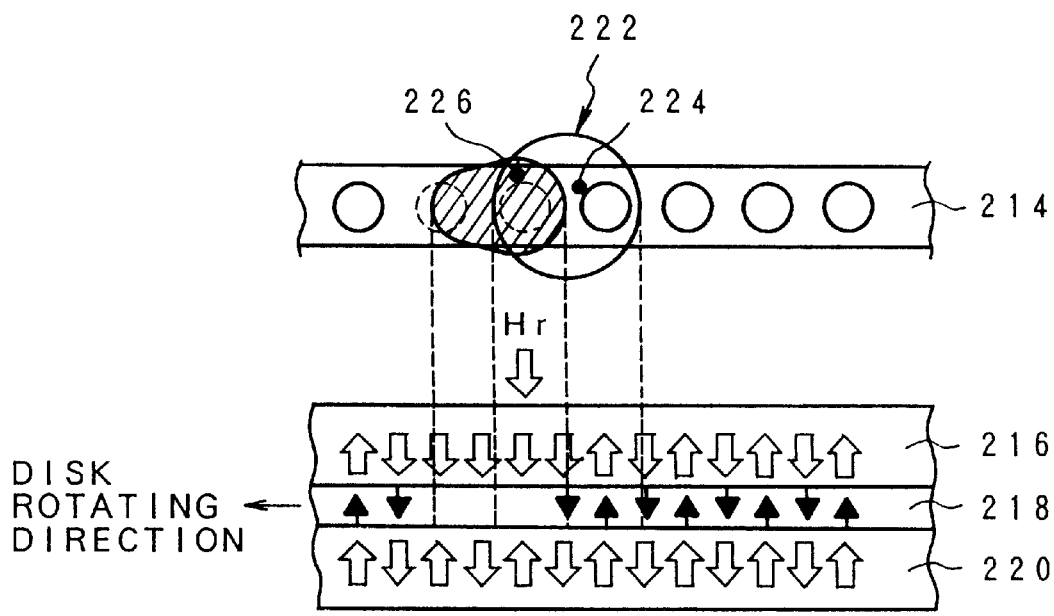
FIGS. 1A and 1B are explanatory diagrams of the reproducing operation of the conventional FAD system.
Figure 1B:
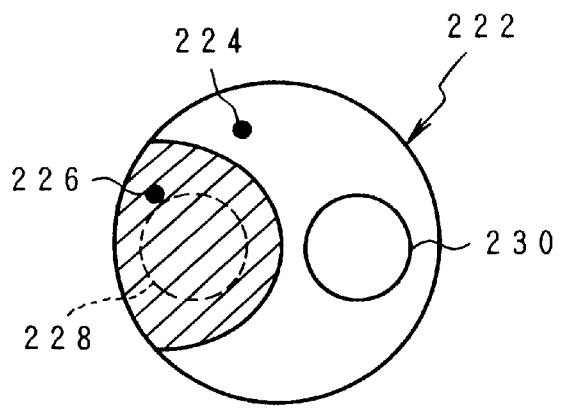

The correcting process of the reproducing magnetic field according to the foregoing embodiment has been performed with respect to the reproducing magnetic field Hr of the FAD medium in FIGS. 1A and 1B. However, in the RAD medium in FIGS. 2A and 2B, by using the initializing magnet 232 as a magnetic field applying unit 44, the initializing magnetic field Hi is constructed. Although the medium to which the magnetically induced super resolution (MSR) is applied fundamentally has the recording layer and the reproducing layer, there are other various media having proper auxiliary layers. Since the external magnetic field is necessary upon reproduction in any one of the media, the reproducing magnetic field is generated by using the magnetic field applying unit with regard to the external magnetic field and can be optimized by the reproducing magnetic field correcting process of the invention.

What is claimed is:

1. An optical storage apparatus comprising:
   a recording unit for recording data into a recording layer of an optical storage medium at a recording mark that is smaller than a beam diameter of a laser beam, said optical storage medium having at least a recording layer to record data and a reproducing layer to reproduce the data recorded into said recording layer;
   a reproducing unit for reproducing the data recorded into said recording layer of said optical storage medium at the recording mark that is smaller than said beam diameter by setting a reproducing magnetic field applied by a magnetic field applying unit and a reproducing laser power of said laser beam to proper values; and
   a reproducing magnetic field correcting unit for determining an optimum value of said reproducing magnetic field at predetermined times by monitoring the occurrence of dissidence in data reproduced by said reproducing unit while increasing the reproducing magnetic field from an initial value which yields less than a threshold level of dissidence.

2. An apparatus according to claim 1, wherein said reproducing magnetic field correcting unit determines said optimum value by adding a predetermined value α to said initial value.

3. An apparatus according to claim 1, wherein said reproducing magnetic field correcting unit determines said optimum value by multiplying said initial value by a predetermined coefficient α, α being greater than 1.

4. An apparatus according to claim 1, wherein said reproducing magnetic field correcting unit determines said optimum value by increasing the reproducing magnetic field from a low magnetic field obtained by subtracting a predetermined value α from said initial value.

5. An apparatus according to claim 1, wherein said reproducing magnetic field correcting unit determines said optimum value by increasing the reproducing magnetic field from a low magnetic field obtained by multiplying said initial value by a predetermined coefficient α, α being less than 1.

6. An apparatus according to claim 1, wherein said reproducing magnetic field correcting unit measures the occurrences of dissidence using predefined data reproduced from a predetermined area of said optical storage medium on a bit unit basis, and determines that data can be reproduced when the number of bit errors is equal to or less than a predetermined value.

7. An apparatus according to claim 1, wherein said reproducing magnetic field correcting unit is temporarily interrupted during the correction of the reproducing magnetic field, when an interrupting request is generated from an upper apparatus, and resumes after completion of the interrupting process.

8. A method of recording and reproducing an optical storage medium, comprising the steps of:
   recording data into a recording layer of the optical storage medium at a recording mark that is smaller than a beam diameter of a laser beam by using said optical storage medium having at least a recording layer to record data and a reproducing layer to reproduce the data recorded into said recording layer;
   reproducing the data recorded into said recording layer of said optical storage medium at the recording mark that is smaller than said beam diameter by setting a reproducing magnetic field applied by a magnetic field applying unit and a reproducing laser power of said laser beam to proper values; and
   prior to the reproduction of said optical storage medium, executing a reproducing magnetic field correcting process for monitoring a reproducing state while increasing the reproducing magnetic field by using a predetermined reproducing magnetic field as an initial value and for determining the reproducing magnetic field in a reproducible state as an optimum reproducing magnetic field.

9. An optical storage apparatus comprising:
   a recording unit for recording data into a recording layer of an optical storage medium at a recording mark that is smaller than a beam diameter of a laser beam by using said optical storage medium having at least a recording layer to record data and a reproducing layer to reproduce the data recorded into said recording layer;
   a reproducing unit for reproducing the data recorded into said recording layer of said optical storage medium at the recording mark that is smaller than said beam diameter by setting a reproducing magnetic field applied by a magnetic field applying unit and a reproducing laser power of said beam to proper values; and
   a reproducing magnetic field correcting unit for monitoring a reproducing state by said reproducing unit while changing the reproducing magnetic field at a predetermined timing after the medium was inserted and for determining an optimum reproducing magnetic field;
   wherein said reproducing magnetic field correcting unit corrects the reproducing magnetic field during an initialization diagnosing process in association with a turn-on of a power source of the apparatus, just after said optical storage medium was inserted into the apparatus, when a change in an internal temperature of the apparatus is equal to or larger than a predetermined value, when a predetermined correction valid time elapses from a previous correction, when an error occurs in said reproducing unit and a retrying process is performed, or at the time of start-up of the apparatus from a factory.

10. An apparatus according to claim 9, wherein said reproducing magnetic field correcting unit determines said optimum magnetic field every predetermined zone of said optical storage medium and stores it into a memory.

11. An optical storage apparatus comprising:
   a reproducing unit for reproducing data recorded into a recording layer of an optical storage medium at a recording mark that is smaller than a beam diameter of a laser beam by setting a reproducing magnetic field applied by a magnetic field applying unit and a reproducing laser power of said beam to proper values; and a reproducing magnetic field correcting unit for monitoring a reproducing state by said reproducing unit while changing the reproducing magnetic field at a predetermined timing after the medium was inserted and for determining an optimum reproducing magnetic field;

wherein said reproducing magnetic field correcting unit corrects the reproducing magnetic field during an initialization diagnosing process in association with a turn-on of a power source of the apparatus, just after said optical storage medium was inserted into the apparatus, when a change in an internal temperature of the apparatus is equal to or larger than a predetermined value, when a predetermined correction valid time elapses from a previous correction, when an error occurs in said reproducing unit and a retrying process is performed, or at the time of start-up of the apparatus from a factory.

12. An apparatus according to claim 11, wherein said reproducing magnetic field correcting unit limits the reproducing magnetic field so as to not be equal to or larger than a predetermined value.

13. An apparatus according to claim 11, wherein said reproducing magnetic field correcting unit detects that a level of a peak detection signal of an RF signal reproduced from a medium return light by said reproducing unit is equal to or larger than a predetermined value, thereby determining that the signal can be reproduced.

14. An apparatus according to claim 11, wherein said reproducing magnetic field correcting unit detects that the number of ECC correction errors for the reproduction data of said reproducing unit is equal to or less than a predetermined value, thereby determining that the data can be reproduced.

15. An apparatus according to claim 11, wherein said reproducing magnetic field correcting unit uniquely determines said optimum value of said reproducing magnetic field for every predetermined zone of said optical storage medium and stores each said optimum value into a memory.

16. An apparatus according to claim 15, wherein said reproducing unit reads out the optimum value of said reproducing magnetic field of a zone corresponding to a reproducing position of said optical storage medium from said memory and uses said optimum value to drive said magnetic field applying unit.

17. An apparatus according to claim 15, wherein said reproducing unit obtains the optimum value of said reproducing magnetic field corresponding to a reproducing position of said optical storage medium by a linear approximation of the optimum magnetic field of a zone read out from said memory and uses said optimum value to drive said magnetic field applying unit.

18. An apparatus according to claim 11, wherein said reproducing unit corrects the optimum value of said reproducing magnetic field determined by said reproducing magnetic field correcting unit in accordance with a temperature in the apparatus upon reproduction and uses said corrected value to drive said magnetic field applying unit.

19. An apparatus according to claim 11, wherein said reproducing unit generates the optimum value of said reproducing magnetic field for only a reproducing period in a sector of said optical storage medium in which a reproduction gate signal is on.

20. An apparatus according to claim 11, wherein said reproducing magnetic field correcting unit corrects the reproducing magnetic field at the time of an initialization diagnosing process in association with a turn-on of a power source of the apparatus.

21. An apparatus according to claim 11, wherein said reproducing magnetic field correcting unit corrects the reproducing magnetic field when said optical storage medium is inserted into the apparatus.

22. An apparatus according to claim 11, wherein said reproducing magnetic field correcting unit monitors a temperature in the apparatus and corrects the reproducing magnetic field when a change in said internal temperature is equal to or larger than a predetermined value.

23. An apparatus according to claim 11, wherein said reproducing magnetic field correcting unit monitors an elapsed time from a previous correction and corrects the reproducing magnetic field when a predetermined correction valid time elapses.

24. An apparatus according to claim 11, wherein said reproducing magnetic field correcting unit corrects the reproducing magnetic field when an error occurs in said reproducing unit and a retrying process is performed.

* * * * *

UNITED STATES PATENT AND TRADEMARK OFFICE
CERTIFICATE OF CORRECTION

PATENT NO.    : 6,324,128 B1                                          Page 1 of 1
DATED         : November 27, 2001
INVENTOR(S)   : Ikeda et al.

It is certified that error appears in the above-identified patent and that said Letters Patent is hereby corrected as shown below:

Drawings,
In the drawings, sheet 15, FIG. 12B, there should be a straight vertical line that connects and creates a continuous line between the right end of the "NO" line extending from step S9 and the right end of the left-extending arrow terminating steps S12 and S13, as shown in the substitute Figure below:

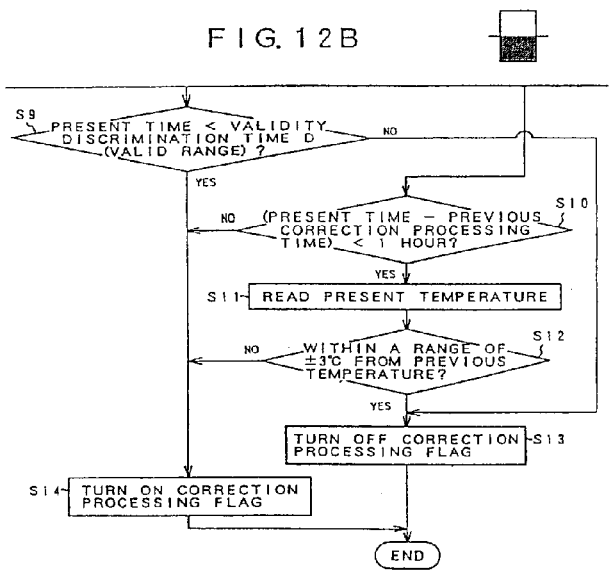

Signed and Sealed this

Twenty-third Day of September, 2003

JAMES E. ROGAN
*Director of the United States Patent and Trademark Office*